(12) United States Patent
Moriya et al.

(10) Patent No.: US 9,667,019 B2
(45) Date of Patent: May 30, 2017

(54) LASER APPARATUS AND EXTREME ULTRAVIOLET LIGHT GENERATION SYSTEM

(71) Applicant: GIGAPHOTON INC., Tochigi (JP)

(72) Inventors: Masato Moriya, Tochigi (JP); Takashi Suganuma, Tochigi (JP); Osamu Wakabayashi, Tochigi (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 14/748,332

(22) Filed: Jun. 24, 2015

(65) Prior Publication Data

US 2015/0340838 A1    Nov. 26, 2015

Related U.S. Application Data

(63) Continuation of application No. PCT/JP2013/084697, filed on Dec. 25, 2013.

(30) Foreign Application Priority Data

Jan. 31, 2013    (JP) ................................. 2013-017272

(51) Int. Cl.
*H01S 3/00* (2006.01)
*H05G 2/00* (2006.01)
*H01S 3/223* (2006.01)
*H01S 3/23* (2006.01)

(52) U.S. Cl.
CPC ............ *H01S 3/0064* (2013.01); *H01S 3/005* (2013.01); *H01S 3/2232* (2013.01); *H01S 3/2316* (2013.01); *H05G 2/008* (2013.01); *H01S 2301/02* (2013.01)

(58) Field of Classification Search
CPC .......... H01S 3/0064; H01S 3/00; H01S 3/005; H01S 3/10; H01S 3/2232; H01S 3/23; H01S 3/2316; H01S 2301/02; H05G 2/008
See application file for complete search history.

(56) References Cited

U.S. PATENT DOCUMENTS

| 4,498,728 A | * | 2/1985 | Thoni ................. C03C 17/3452 359/359 |
|---|---|---|---|
| 6,594,291 B1 | | 7/2003 | Takehisa |
| 2003/0065312 A1 | | 4/2003 | Owa et al. |
| 2004/0202220 A1 | | 10/2004 | Hua et al. |
| 2006/0007978 A1 | | 1/2006 | Govorkov et al. |

(Continued)

FOREIGN PATENT DOCUMENTS

| GB | 2040549 A | * | 8/1980 | ........... H01S 3/2333 |
|---|---|---|---|---|
| JP | 2000-357836 A | | 12/2000 | |

(Continued)

OTHER PUBLICATIONS

International Search Report; PCT/JP2013/084697; Apr. 1, 2014.

*Primary Examiner* — Jack Berman
(74) *Attorney, Agent, or Firm* — Studebaker & Brackett PC

(57) ABSTRACT

There may be included: a master oscillator configured to output pulsed laser light; two or more power amplifiers disposed in an optical path of the pulsed laser light to amplify the pulsed laser light; and an optical isolator provided between adjacent two of the power amplifiers in the optical path of the pulsed laser light, and configured to suppress transmission of light traveling from the power amplifiers to a side where the master oscillator is provided.

11 Claims, 24 Drawing Sheets

(56) References Cited

U.S. PATENT DOCUMENTS

| | | |
|---|---|---|
| 2008/0069157 A1 | 3/2008 | Ariga et al. |
| 2009/0232171 A1* | 9/2009 | Abe .................... H01S 3/2316 372/25 |
| 2010/0078580 A1 | 4/2010 | Endo et al. |
| 2010/0193710 A1 | 8/2010 | Wakabayashi et al. |
| 2011/0058588 A1 | 3/2011 | Ershov et al. |
| 2012/0193547 A1 | 8/2012 | Hansson et al. |

FOREIGN PATENT DOCUMENTS

| | | |
|---|---|---|
| JP | 2001-353176 A | 12/2001 |
| JP | 2008-085292 A | 4/2008 |
| JP | 2008-283107 A | 11/2008 |
| JP | 2009-246345 A | 10/2009 |
| JP | 2010-103104 A | 5/2010 |
| JP | 2010-171375 A | 8/2010 |
| JP | 5086677 B2 | 11/2012 |
| WO | 2012/085638 A2 | 6/2012 |
| WO | 2012/114178 A2 | 8/2012 |

* cited by examiner

LASER APPARATUS AND EXTREME ULTRAVIOLET LIGHT GENERATION SYSTEM

TECHNICAL FIELD

The present disclosure relates to a laser apparatus and an extreme ultraviolet light generation system.

BACKGROUND ART

In recent years, microfabrication of transfer patterns in photolithography in semiconductor processes has been rapidly developed with microfabrication in the semiconductor processes. In the next generation, microfabrication processing in a range of 70 nm to 45 nm, and further microfabrication processing in a range of 32 nm or less may be demanded. Therefore, for example, to meet the demand for microfabrication processing in the range of 32 nm or less, it is expected to develop exposure apparatuses configured of a combination of an apparatus that is configured to generate extreme ultraviolet (EUV) light with a wavelength of about 13 nm and a catadioptric system.

Three kinds of EUV light generation systems have been proposed, that include an LPP (Laser Produced Plasma) system using plasma generated by irradiating a target material with laser light, a DPP (Discharge Produced Plasma) system using plasma generated by electric discharge, and an SR (Synchrotron Radiation) system using synchrotron radiation.

CITATION LIST

Patent Literature

PTL 1: Japanese Unexamined Patent Application Publication No. 2010-103104
PTL 2: Japanese Patent No. 5086677
PTL 3: Japanese Unexamined Patent Application Publication No. 2008-283107
PTL 4: Specification of U.S. Patent Application Publication No. 2011/0058588
PTL 5: Specification of U.S. Patent Application Publication No. 2012/0193547

SUMMARY

A laser apparatus may include: a master oscillator configured to output pulsed laser light; two or more power amplifiers disposed in an optical path of the pulsed laser light to amplify the pulsed laser light; and an optical isolator provided between adjacent two of the power amplifiers in the optical path of the pulsed laser light, and configured to suppress transmission of light traveling from the power amplifiers to a side where the master oscillator is provided.

BRIEF DESCRIPTION OF DRAWINGS

Some embodiments of the disclosure are described below as mere examples with reference to the accompanying drawings.

EMBODIMENTS

Figure 1:
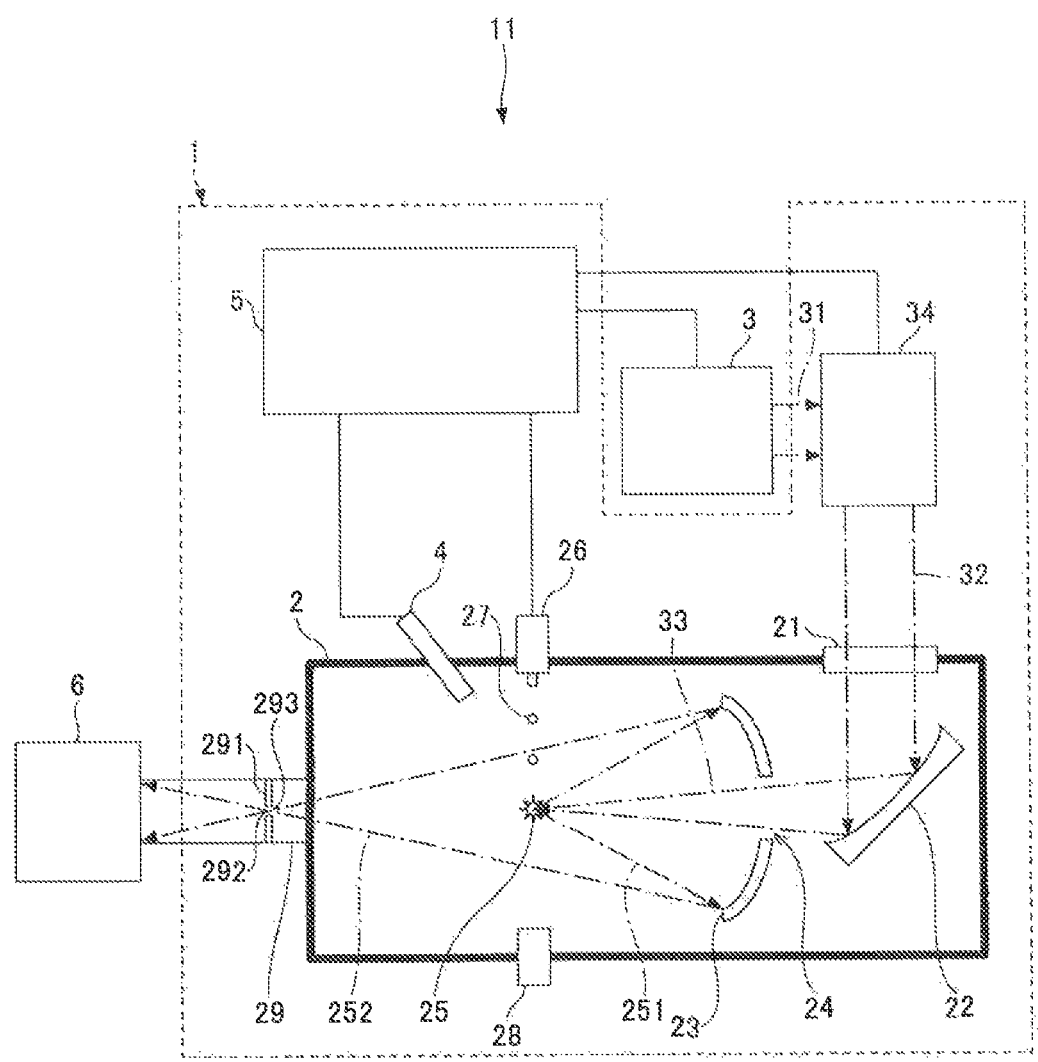
FIG. 1 is a schematic configuration diagram of an exemplary laser produced plasma (LPP) extreme ultraviolet (EUV) light generation system according to an embodiment of the present disclosure.

In the following, some embodiments of the disclosure are described in detail with reference to the drawings. Embodiments described below each illustrates one example of the disclosure and are not intended to limit the contents of the disclosure. Also, all of the configurations and operations described in each embodiment are not necessarily essential for the configurations and operations of the disclosure. Note that the like elements are denoted with the same reference numerals, and any redundant description thereof is omitted.

Contents
1. Description of terms
2. Overview of EUV light generation system
   2.1 Configuration
   2.2 Operation
3. Laser apparatus including master oscillator and amplifier
   3.1 Configuration
   3.2 Operation
   3.3 Problem
4. Laser apparatus including optical isolator
   4.1 Configuration
   4.2 Operation
   4.3 Action
5. Laser apparatus including a plurality of optical isolators
   5.1 Configuration
   5.2 Operation
   5.3 Action
   5.4 Application example
6. Laser apparatus including optical isolator provided with wavelength filter and the like
   6.1 Laser apparatus including optical isolator provided with wavelength filter
      6.1.1 Configuration
      6.1.2 Operation
      6.1.3 Action
      6.1.4 Others
   6.2 Laser apparatus including optical isolator provided with spatial filter and wavelength filter
      6.2.1 Configuration
      6.2.2 Operation
      6.2.3 Action
      6.2.4 Others
   6.3 Laser apparatus including optical isolator provided with saturable absorption gas cell and wavelength filter
      6.3.1 Configuration
      6.3.2 Operation
      6.3.3 Action
   6.4 Laser apparatus including optical isolator provided with EO Pockels cell and wavelength filter
      6.4.1 Configuration
      6.4.2 Operation
      6.4.3 Control
         6.4.4.1 Configuration of control circuit
         6.4.3.2 Operation of control circuit
      6.4.4 Action
7. Polarizer
8. Wavelength filter
   8.1 Wavelength filter in which multilayer film is formed
   8.2 Wavelength filter using a plurality of polarizers
   8.3 Wavelength filter using etalon
   8.4 Wavelength filter including grating and slit
9. Retarder
   1. Description of Terms Terms used in the present disclosure will be defined as follows. The term "plasma generation region" refers to a region where plasma is generated by irradiating a target material with pulsed laser light. The term "droplet" refers to a liquid droplet and a sphere. The term "optical path" refers to a path through which laser light passes. The term "optical path length" refers to a product of a distance where light actually travels and a refractive index of a medium through which the light passes. The term "amplification wavelength range" refers to a wavelength band that is amplifiable when laser light passes through an amplification region.

The side closer to a master oscillator along an optical path of laser light is referred to as "upstream". Moreover, the side closer to the plasma generation region along the optical path of the laser light is referred to as "downstream". The optical path may refer to an axis passing through a nearly center of a beam section of laser light along a traveling direction of the laser light.

In the present disclosure, a traveling direction of laser light is defined as "Z direction". Moreover, one direction perpendicular to this Z direction is defined as "X direction", and a direction perpendicular to the X direction and the Z direction is defined as "Y direction". Although the traveling direction of laser light refers to the Z direction, in the description, the X direction and Y direction may change depending on the position of laser light that is to be mentioned. For example, in a case where the traveling direction (Z direction) of laser light changes in an X-Z plane, after the traveling direction changes, the X direction may change depending on such change in the traveling direction, but the Y direction may not change. On the other hand, in a case where the traveling direction (Z direction) of laser light changes in a Y-Z plane, after the traveling direction changes, the Y direction may change depending on such change in the traveling direction, but the X direction may not change.

In a reflective optical device, in a case where a plane including both an optical axis of laser light entering the optical device and an optical axis of laser light reflected by the optical device serves as an incident plane, "S-polarization" refers to a polarization state along a direction perpendicular to the incident plane. On the other hand, "P-polarization" refers to a polarization state along a direction orthogonal to an optical path and parallel to the incident plane.

2. Overview of EUV Light Generation System
2.1 Configuration

FIG. 1 schematically illustrates a configuration of an exemplary LPP-EUV light generation system. An EUV light generation system 1 may be used together with at least one laser apparatus 3. In this application, a system including the EUV light generation system 1 and the laser apparatus 3 is referred to as "EUV light generation system 11". As illustrated in FIG. 1 and as will be described in detail below, the EUV light generation system 1 may include a chamber 2 and a target feeding section 26. The chamber 2 may be hermetically sealable. The target feeding section 26 may be so mounted as to penetrate a wall of the chamber 2, for example. As a material of a target material that is to be fed by the target feeding section 26 may include tin, terbium, gadolinium, lithium, xenon, or a combination of any two or more of them, but is not limited thereto.

The chamber 2 may include at least one through hole in its wall. A window 21 may be provided in the through hole, and pulsed laser light 32 outputted from the laser apparatus 3 may pass through the window 21. For example, an EUV collector mirror 23 with a spheroidal reflective surface may be provided in the chamber 2. The EUV collector mirror 23 may be provided with a first focal point and a second focal point. For example, a multilayer reflective film in which molybdenum and silicon are alternately laminated may be formed on a surface of the EUV collector mirror 23. The EUV collector mirror 23 may be preferably so disposed that the first focal point and the second focal point are located in a plasma generation region 25 and an intermediate condensing point (IF) 292, respectively, for example. A through hole 24 may be provided in a central portion of the EUV collector mirror 23, and pulsed laser light 33 may pass through the through hole 24.

The EUV light generation system 1 may include an EUV light generation control section 5, a target sensor 4, and the like. The target sensor 4 may be provided with an image pickup function, and may be configured to detect the presence, trajectory, position, speed, and the like of a target 27.

Moreover, the EUV light generation system 1 may include a connection section 29 that allows the interior of the chamber 2 to communicate with the interior of an exposure apparatus 6. A wall 291 in which an aperture 293 is formed may be provided in the connection section 29. The wall 291 may be so disposed that the aperture 293 is placed at the position of the second focal point of the EUV collector mirror 23.

Further, the EUV light generation system 1 may include a laser light traveling direction control section 34, a laser light collecting mirror 22, a target collection section 28 configured to collect the target 27, and the like. The laser light traveling direction control section 34 may include an optical device configured to define the traveling direction of laser light, and an actuator configured to adjust the position, posture, and the like of this optical device.

2.2 Operation

With reference to FIG. 1, pulsed laser light 31 outputted from the laser apparatus 3 may pass through the laser light traveling direction control section 34, and the pulsed laser light 31 having passed through the laser light traveling direction control section 34 may pass through the window 21 as pulsed laser light 32 to enter the chamber 2. The pulsed laser light 32 may travel in the chamber 2 along at least one laser light path, and may be reflected by the laser light collecting mirror 22 to be applied as pulsed laser light 33 to at least one target 27.

The target feeding section 26 may be configured to output the target 27 to the plasma generation region 25 in the chamber 2. The target 27 may be irradiated with at least one pulse included in the pulsed laser light 33. The target 27 irradiated with pulsed laser light may be turned into plasma, and radiation light 251 may be outputted from the plasma. EUV light 252 included in the radiation light 251 may be selectively reflected by the EUV collector mirror 23. The EUV light 252 reflected by the EUV collector mirror 23 may be condensed on the intermediate condensing point 292 to be outputted to the exposure apparatus 6. It is to be noted that a plurality of pulses included in the pulsed laser light 33 may be applied to one target 27.

The EUV light generation control section 5 may be configured to control the overall EUV light generation system 11. The EUV light generation control section 5 may be configured to process image data or the like of the target 27 that is imaged by the target sensor 4. Moreover, the EUV light generation control section 5 may be configured to control, for example, a timing at which the target 27 is outputted, a direction where the target 27 is outputted, and the like. Further, the EUV light generation control section 5 may be configured to control, for example, an oscillation timing of the laser apparatus 3, a traveling direction of the pulsed laser light 32, a position where the pulsed laser light 33 is condensed, and the like. The above-described various controls are merely examples, and any other control may be added as necessary.

3. Laser Apparatus Including Master Oscillator and Amplifier

Incidentally, the LPP-EUV light generation system may include a $CO_2$ laser apparatus as the laser apparatus 3. The $CO_2$ laser apparatus used as the laser apparatus 3 may be desired to output pulsed laser light with high pulse energy at a high repetition frequency. Therefore, the laser apparatus 3 may include a master oscillator (MO) that outputs pulsed laser light at a high repetition frequency and a plurality of power amplifiers (PAs) each of which amplifies pulsed laser light.

In such a MOPA laser apparatus including the MO and the PAs, it may not be possible to amplify only pulsed laser light outputted from the MO due to reflected light from the target or self-oscillation.

3.1 Configuration

Figure 2:
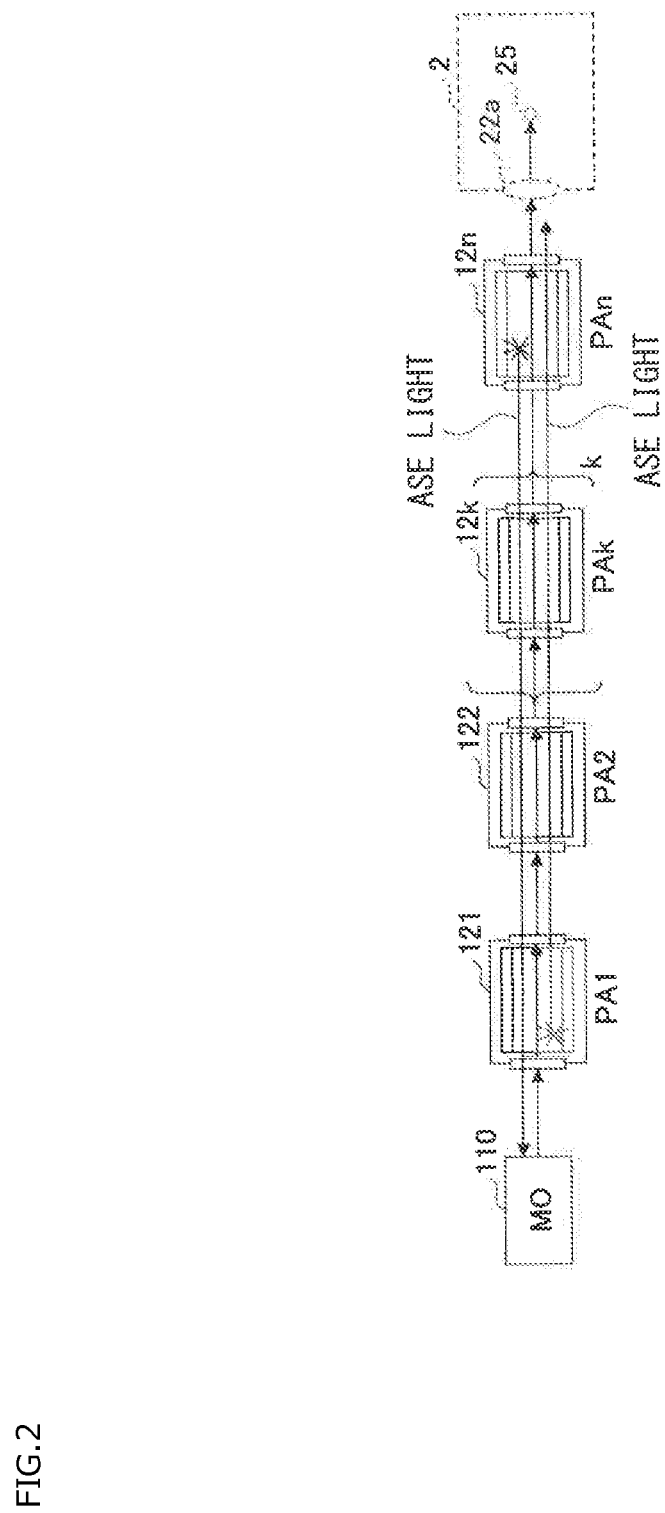
FIG. 2 is a configuration diagram of a laser apparatus that outputs $CO_2$ laser light used for the LPP-EUV light generation system.

With reference to FIG. 2, a laser apparatus used in the LPP-EUV light generation system will be described below. A laser apparatus illustrated in FIG. 2 may include an MO 110 and at least one or more power amplifiers, for example, power amplifiers 121, 122, . . . , 12k, . . . , and 12n. It is to be noted that the power amplifiers 121, 122, . . . , 12k, . . . , and 12n may be denoted to as PA1, PA2, . . . , PAk, . . . , and PAn, respectively, in drawings and the like.

The MO 110 may be a laser oscillator including a Q switch, a $CO_2$ laser gas medium, and an optical resonator. The one or more power amplifiers, for example, the power amplifiers 121, 122, . . . , 12k, . . . , and 12n may be disposed in an optical path of pulsed laser light outputted from the MO 110. The one or more power amplifiers, for example, each of the power amplifiers 121, 122, . . . , 12k, . . . , and 12n may be a power amplifier in which a pair of electrodes is provided in a chamber containing $CO_2$ laser gas. An entrance window and an exit window that allow pulsed laser light to pass therethrough may be provided in the power amplifier. It is to be noted that, in this application, pulsed laser light outputted from the MO 110 and pulsed laser light derived from amplification of the pulsed laser light outputted from the MO 110 by the power amplifier may be referred to as "seed light".

Moreover, the MO 110 may be a quantum cascade laser (QCL) that oscillates in a wavelength band of $CO_2$ laser light. In this case, pulsed laser light may be outputted by controlling a pulse current that flows through the quantum cascade laser serving as the MO 110.

3.2 Operation

The power amplifiers 121, 122, . . . , 12k, . . . , and 12n each may apply a potential between a pair of electrodes by their power supplies that are unillustrated to perform electric discharge. Laser oscillation may be caused by operating the Q switch of the MO 110 at a predetermined repetition frequency. As a result, pulsed laser light may be outputted from the MO 110 at the predetermined repetition frequency.

Even in a case where pulsed laser light outputted from the MO 110 does not enter the power amplifiers 121, 122, . . . , 12k, . . . , and 12n, the power amplifiers 121, 122, . . . , 12k, and 12n may perform electric discharge by an unillustrated power supply to excite $CO_2$ laser gas. The pulsed laser light outputted from the MO 110 may enter the power amplifier 121 and pass through the inside of the power amplifier 121 to be subjected to amplification, following which the thus-amplified pulsed laser light may be outputted. The amplified pulsed laser light outputted from the power amplifier 121 may enter the power amplifier 122 and pass through the inside of the power amplifier 122 to be subjected to further amplification, following which the thus-amplified pulsed laser light may be outputted. Likewise, pulsed laser light outputted from an unillustrated power amplifier that is adjacent to the power amplifier 12k on the upstream side of the power amplifier 12k may enter the power amplifier 12k and pass through the inside of the power amplifier 12k to be subjected to further amplification, following which the thus-amplified pulsed laser light may be outputted. Then, pulsed laser light outputted from an unillustrated power amplifier that is adjacent to the power amplifier 12n on the upstream side of the power amplifier 12n may enter the power amplifier 12n and pass through the inside of the power amplifier 12n to be subjected to be further amplification, following which the thus-amplified pulsed laser light may be outputted. The pulsed laser light outputted from the power amplifier 12n may enter the chamber 2, and the thus-entered pulsed laser light may be condensed on the plasma generation region 25 by a laser light condensing optical system 22a to be applied to a target in the plasma generation region 25. It is to be noted that the laser light condensing optical system 22a may be configured of a reflective optical device or a plurality of reflective optical devices corresponding to the laser light collecting mirror 22 illustrated in FIG. 1, or may be a refractive optical system including a lens. In this application, the laser light condensing optical device may include the laser light condensing optical system 22a and the laser light collecting mirror 22.

3.3 Problem

Here, reflected light of pulsed laser light applied to the target may enter the power amplifiers 12n, . . . , 12k, . . . , 122, and 121 through the laser light condensing optical system 22a, and the entered reflected light may be thereby amplified. Moreover, reflected light of pulsed laser light on the entrance windows, the exit windows, etc. in the power amplifiers 121, 122, . . . , 12k, . . . , and 12n disposed in a path of the pulsed laser light outputted from MO 110 may be also amplified. Such amplified reflected light may reach the MO 110.

Moreover, ASE light generated in the power amplifier 12n may travel toward a direction where the MO 110 is provided, and may be amplified and self-oscillate by the plurality of power amplifiers 12k, . . . , 122, 121, and the like. Further, ASE light generated in the power amplifier 121 may travel toward a target direction, and may be amplified and self-oscillate by the plurality of power amplifiers 122, . . . , 12k, . . . , and 12n.

The occurrence of such self-oscillation may cause a reduction in output of pulsed laser light outputted from the laser apparatus or an adverse effect on a pulse waveform. As a result, output of EUV light may be reduced.

4. Laser Apparatus Including Optical Isolator 4.1 Configuration

Next, the laser apparatus of the present disclosure will be described below with reference to FIG. 3. The laser apparatus of the present disclosure may include the MO 110, the plurality of power amplifiers 121, 122, . . . , 12k, . . . , and 12n, and an optical isolator 140. Moreover, an aperture plate 13 with an opening section 13a may be provided between the laser apparatus 3 and the laser light condensing optical system 22a in the chamber 2, and may be so disposed as to allow pulsed laser light to pass through the opening section 13a.

The MO 110 may be a $CO_2$ laser oscillator including a Q switch, or may be a quantum cascade laser. The MO 110 may output predetermined linearly polarized pulsed laser light with a wavelength of an amplification line of $CO_2$ laser gas.

At least one of the power amplifiers 121, 122, . . . , 12k, . . . , and 12n may be disposed in an optical path of pulsed laser light outputted from the MO 110.

Each of the power amplifiers 121, 122, . . . , 12k, . . . , and 12n may include a pair of electrodes, an entrance window, and an exit window, and may include a chamber including $CO_2$ laser gas and an unillustrated power supply that applies a potential to the pair of electrodes.

The optical isolator 140 may be disposed in an optical path of pulsed laser light between the power amplifier 12n and a power amplifier (for example, the power amplifier 12k) adjacent to the power amplifier 12n. This optical isolator 140 may be disposed in any position between adjacent two of the power amplifiers 121, 122, . . . , 12k, . . . , and 12n in the optical path of pulsed laser light. Moreover, the optical isolator 140 may be disposed in the optical path of pulsed laser light between the MO 110 and the power amplifier 121.

The optical isolator 140 may include a polarizer 410 and a retarder 420. The polarizer 410 may be so disposed as to allow a linearly polarized component of the pulsed laser light outputted from the MO 110 to pass therethrough. The retarder 420 may be so disposed as to convert linearly polarized light having passed through the polarizer 410 into circularly polarized light. A crystal material forming the retarder 420 may be a CdS crystal.

The polarizer 410 may be a polarizer that allows a linearly polarized component in the Y direction outputted from MO 110 to pass therethrough at high transmittance and reflects a linearly polarized component in the X direction outputted from MO 110 at high reflectivity. For example, the polarizer 410 may be a polarizer in which a surface of a diamond, ZnSe, or GaAs substrate or the like allowing $CO_2$ laser light to pass therethrough is coated with a multilayer film that allows P-polarized light to pass therethrough at high transmittance and reflects S-polarized light at high reflectivity. This multilayer film may use ZnSe, ZnS, or the like as a high refractive index material and $ThF_4$, $PbF_2$, or the like as a low refractive index material.

The retarder 420 may be an optical device that converts linearly polarized light into circularly polarized light. For example, the retarder 420 may be a λ/4 plate that provides a phase difference of 90°, i.e., a phase difference of ¼ wavelength to entered light. The retarder 420 may be so disposed as to set a slow axis thereof at 45° with respect to linearly polarized light when the linearly polarized light enters.

4.2 Operation

Linearly polarized pulsed laser light in the Y direction outputted from the MO 110 may be amplified by passing through the plurality of power amplifiers 121, 122, . . . , 12k, . . . , and 12n. Amplified pulsed laser light outputted from a power amplifier (for example, the power amplifier 12k) adjacent to the power amplifier 12n may enter the optical isolator 140. Since the pulsed laser light having entered the optical isolator 140 is linearly polarized light in the Y direction, the pulsed laser light may pass through the polarizer 410 at high transmittance.

The linearly polarized pulsed laser light in the Y direction having passed through the polarizer 410 may pass through the retarder 420, thereby changing a phase difference thereof to 90° to convert the linearly polarized pulsed laser light in the Y direction into circularly polarized light. This circularly polarized pulsed laser light may pass through the power amplifier 12n, and may be amplified in the form of circularly polarized light. The circularly polarized pulsed laser light amplified by the power amplifier 12n may be applied to the target in the plasma generation region 25 in the chamber 2 by the laser light condensing optical system 22a. When the circularly polarized pulsed laser light is applied to the target in the plasma generation region 25 in the chamber 2, a part of the pulsed laser light applied to the target may be reflected to be converted into circularly polarized light in a reverse direction of the applied circularly polarized laser light.

The reflected light from the target may be collimated by the laser light condensing optical system 22a to travel toward a reverse direction along the same optical path as the optical path of the pulsed laser light having entered the chamber 2. This reflected light may pass through the power amplifier 12n, thereby being amplified.

The amplified reverse-circularly polarized reflected light may be converted into linearly polarized light in the X direction by passing through the retarder 420. This linearly polarized light in the X direction may enter the polarizer 410 as S-polarized light, and may be reflected by the polarizer 410 at high reflectivity. Moreover, reflected light from the entrance window and the exit window of the power amplifier 12n or from the aperture plate 13 disposed in the optical path of pulsed laser light may be also separated from the optical path of the pulsed laser light by the optical isolator 140 in a similar manner.

4.3 Action

When the optical isolator 140 is provided between adjacent two of the power amplifiers 121, 122, ..., 12k, ..., and 12n, reflected light from the target, the optical device, or the like may be prevented from traveling along the optical path of pulsed laser light on an upstream side of a position where the optical isolator 40 is provided.

Moreover, power of ASE light generated in the power amplifiers 121, 122, ..., 12k, ..., and 12n may be attenuated by half by the polarizer 410.

Figure 3:
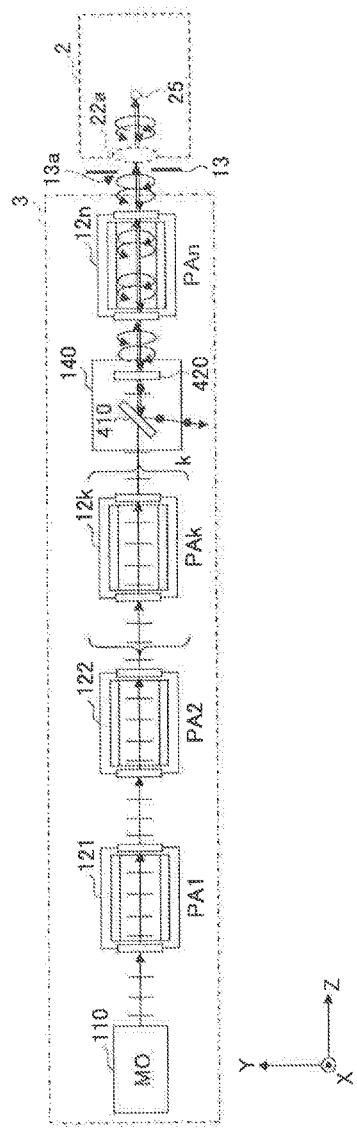
FIG. 3 is a configuration diagram of a laser apparatus including an optical isolator of the present disclosure.

It is to be noted that, in FIG. 3, a case where the polarizer 410 is a transmissive polarizer is described; however, the polarizer 410 is not limited to this example. A reflective polarizer that reflects a polarized component in a selected one direction at high reflectivity and absorbs a polarized component in another direction orthogonal to the one direction subjected to suppression may be used. Moreover, in FIG. 3, a case where the retarder 420 is a transmissive λ/4 wavelength plate is described; however, the retarder 420 is not limited to this example. The retarder 420 may be a reflective retarder coated with a multilayer film that converts linearly polarized light into circularly polarized light and reflects the circularly polarized light at high reflectivity. Further, each of the power amplifiers 121, 122, ..., 12k, ..., and 12n may be a triaxial orthogonal power amplifier or a high speed axial flow power amplifier.

5. Laser Apparatus Including a Plurality of Optical Isolators 5.1 Configuration

Figure 4:
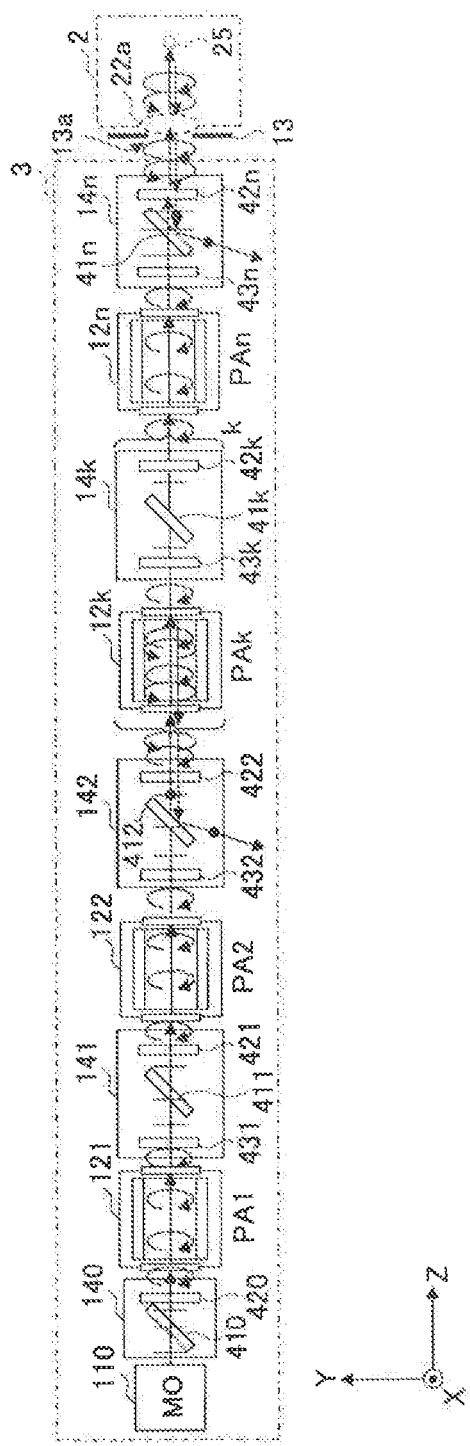
FIG. 4 is a configuration diagram of a laser apparatus including a plurality of optical isolators of the present disclosure.

As illustrated in FIG. 4, in the laser apparatus of the present disclosure, corresponding one of a plurality of optical isolators 141, 142, ..., and 14k may be provided between every adjacent two of the power amplifiers 121, 122, ..., 12k, ..., and 12n in the optical path of the pulsed laser light outputted from MO 110. For example, as illustrated in FIG. 4, corresponding one of the optical isolators 141, 142, ..., and 14k may be provided between every adjacent two of the power amplifiers 121, 122, ..., 12k, ..., and 12n in the optical path of the pulsed laser light.

Further, the optical isolator 140 may be provided between the MO 110 and the power amplifier 121 in the optical path of the pulsed laser light outputted from the MO 110. An optical isolator 14n may be provided between the power amplifier 12n and the laser light condensing optical system 22a in the chamber 2 in the optical path of the pulsed laser light.

The optical isolator 140 may include the polarizer 410 and the retarder 420 disposed in the optical path of the pulsed laser light outputted from the MO 110.

Each of the optical isolators 141, 142, ..., 14k, ..., and 14n may include a polarizer, a first retarder, and a second retarder disposed in the optical path of the pulsed laser light. Moreover, the optical isolators 141, 142, ..., 14k, ..., and 14n each may be disposed in the optical path of the pulsed laser light in order of the first retarder, the polarizer, and the second retarder from upstream to downstream.

More specifically, the optical isolator 141 may be an optical isolator that includes, as optical devices, a first retarder 431, a polarizer 411, and a second retarder 421 disposed in this order from upstream to downstream in the optical path of the pulsed laser light.

Moreover, the optical isolator 142 may be an optical isolator that includes, as optical devices, a first retarder 432, a polarizer 412, and a second retarder 422 disposed in this order from upstream to downstream in the optical path of the pulsed laser light.

Further, the optical isolator 14k may be an optical isolator that includes, as optical devices, a first retarder 43k, a polarizer 41k, and a second retarder 42k disposed in this order from upstream to downstream in the optical path of the pulsed laser light.

Furthermore, the optical isolator 14n may be an optical isolator that includes, as optical devices, a first retarder 43n, a polarizer 41n, and a second retarder 42n disposed in this order from upstream to downstream in the optical path of the pulsed laser light.

Each of the first retarders 431, 432, ..., 43k, ..., and 43n and the second retarders 421, 422, ..., 42k, ..., and 42n may be a λ/4 plate that provides a phase difference of 90°, i.e., a phase difference of ¼ wavelength. Each of the first retarders 431, 432, ..., 43k, ..., and 43n and the second retarders 421, 422, ..., 42k, ..., and 42n may be so disposed as to set a slow axis thereof at 45° with respect to linearly polarized light when the linearly polarized light enters.

5.2 Operation

Linearly polarized pulsed laser light outputted from the MO 110 may enter the optical isolator 140. The pulsed laser light having entered the optical isolator 140 may enter the polarizer 410 of the optical isolator 140 as P-polarized light with respect to an incident surface of the polarizer 410, and may pass through the polarizer 410 at high transmittance. The pulsed laser light having passed through the polarizer 410 may then enter the retarder 420, and may be converted into circularly polarized light by the retarder 420. The pulsed laser light converted into circularly polarized light by the retarder 420 may pass through the power amplifier 121, thereby being amplified.

The amplified circularly polarized pulsed laser light outputted from the power amplifier 121 may enter the optical isolator 141 to enter the first retarder 431 in the optical isolator 141. In the first retarder 431, the amplified circularly polarized pulsed laser light may pass through the first retarder 431, thereby being converted into linearly polarized light in the Y direction. The pulsed laser light converted into linearly polarized light in the Y direction by the first retarder 431 may enter the polarizer 411 of the optical isolator 141 as P-polarized light with respect to an incident surface of the polarizer 411, and may pass through the polarizer 411 at high transmittance. The pulsed laser light having passed through the polarizer 411 at high transmittance may then enter the second retarder 421 to be converted into circularly polarized light again by the second retarder 421. The pulsed laser light converted into circularly polarized light by the retarder 421 may pass through the power amplifier 122, thereby being amplified.

The amplified circularly polarized pulsed laser light outputted from the power amplifier 122 may enter the optical isolator 142 to enter the first retarder 432 in the optical isolator 142. In the first retarder 432, the pulsed laser light may be converted into linearly polarized light in the Y direction by passing through the first retarder 432. The pulsed laser light converted into linearly polarized light in the Y direction may enter the polarizer 412 of the optical isolator 142 as P-polarized light with respect to an incident surface of the polarizer 412, and may pass through the polarizer 412 at high transmittance. The pulsed laser light having passed through the polarizer 412 at high transmittance may then enter the second retarder 422 to be converted into circularly polarized light again by the second retarder 422. The pulsed laser light converted into circularly polarized light by the retarder 422 may pass through an unillustrated power amplifier that is adjacent to the power amplifier 122 on the downstream side of the power amplifier 122, thereby being amplified.

Likewise, the amplified circularly polarized pulsed laser light outputted from the power amplifier 12$k$ may enter the optical isolator 14$k$ to enter the first retarder 43$k$ in the optical isolator 14$k$. In the first retarder 43$k$, the pulsed laser light may be converted into linearly polarized light in the Y direction by passing through the first retarder 43$k$. The pulsed laser light converted into linearly polarized light in the Y direction may enter the polarizer 41$k$ of the optical isolator 14$k$ as P-polarized light with respect to an incident surface of the polarizer 41$k$, and may pass through the polarizer 41$k$ at high transmittance. The pulsed laser light having passed through the polarizer 41$k$ may then enter the second retarder 42$k$ to be converted into circularly polarized light again by the second retarder 42$k$. The pulsed laser light converted into circularly polarized light by the retarder 42$k$ may pass through an unillustrated power amplifier 12$k$+1 that is adjacent to the power amplifier 12$k$ on the downstream side of the power amplifier 12$k$, thereby being amplified.

Moreover, the amplified circularly polarized pulsed laser light outputted from the power amplifier 12$n$ may enter the optical isolator 14$n$ to enter the first retarder 43$n$ in the optical isolator 14$n$. In the first retarder 43$n$, the pulsed laser light may be converted into linearly polarized light in the Y direction by passing through the first retarder 43$n$. The pulsed laser light converted into linearly polarized light in the Y direction may enter the polarizer 41$n$ of the optical isolator 14$n$ as P-polarized light with respect to an incident surface of the polarizer 41$n$, and may pass through the polarizer 41$n$ at high transmittance. The pulsed laser light having passed through the polarizer 41$n$ may then enter the second retarder 42$n$ to be converted into circularly polarized light again by the second retarder 42$n$.

The pulsed laser light converted into circularly polarized light by the retarder 42$n$ may pass through the opening section 13$a$ of the aperture plate 13, and may be condensed on the plasma generation region 25 in the chamber 2 by the laser light condensing optical system 22$a$ to be applied to the target in the plasma generation region 25.

At this time, a part of pulsed laser light from the target may be reflected. This reflected light from the target may be converted into reverse-circularly polarized light, and may be collimated by the laser light condensing optical system 22$a$ to enter the optical isolator 14$n$. The reflected light having entered the optical isolator 14$n$ may be converted into linearly polarized light in the X direction by the second retarder 42$n$ in the optical isolator 14$n$. The reflected light converted into linearly polarized light in the X direction may enter the incident surface of the polarizer 41$n$ as S-polarized light to be reflected at high reflectivity. Likewise, reflected light from the aperture plate 13 may be converted into linearly polarized light in the X direction by the second retarder 42$n$ to enter the polarizer 41$n$ as S-polarized light; therefore, the reflected light from the aperture plate 13 may be reflected at high reflectivity by the polarizer 41$n$, thereby being prevented from entering the power amplifier 12$n$.

Moreover, reflected light from the entrance windows and the exit windows, inner wall surfaces and the like in the power amplifiers 122, . . . , 12$k$, . . . , and 12$n$ may be also converted into linearly polarized light in the X direction by the second retarders 421, 422, . . . , 42$k$, . . . , and 42$k$−1. The linearly polarized reflected light in the X direction may also enter the polarizers 411, 412, . . . , 41$k$, . . . , and 41$k$−1 as S-polarized light to be reflected at high reflectivity.

Figure 5:
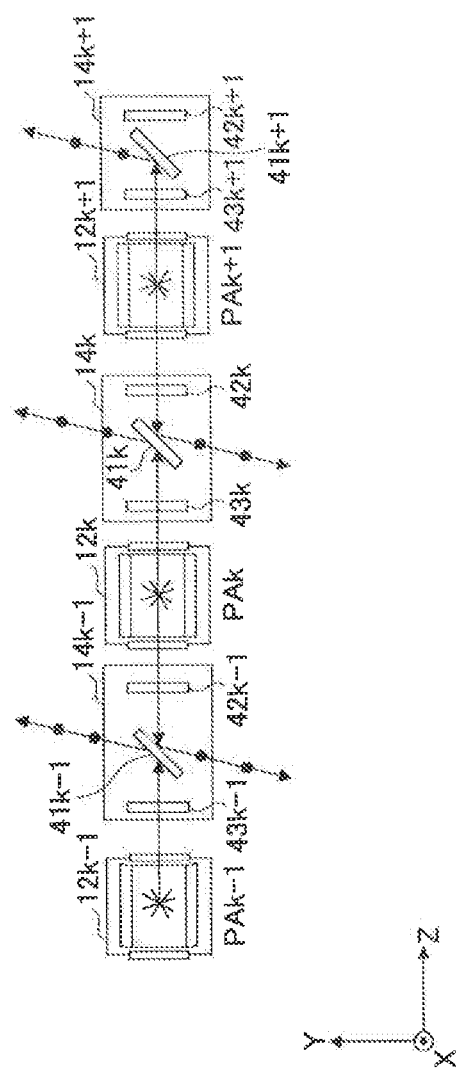
FIG. 5 is an explanatory diagram of generation of ASE light.

Next, suppression of ASE light generated in the power amplifier will be described below with reference to FIG. 5. As illustrated in FIG. 5, an optical isolator 14$k$−1 may be provided between a power amplifier 12$k$−1 and the power amplifier 12$k$ in the optical path of pulsed laser light. Moreover, the optical isolator 14$k$ may be provided between the power amplifier 12$k$ and the power amplifier 12$k$+1 in the optical path of pulsed laser light. Further, an optical isolator 14$k$+1 where pulsed laser light outputted from the power amplifier 12$k$+1 in the optical path of pulsed laser light enters may be provided.

The optical isolator 14$k$−1 may be an optical isolator that includes, as optical devices, a first retarder 43$k$−1, a polarizer 41$k$−1, and a second retarder 42$k$−1 disposed in this order from upstream to downstream in the optical path of pulsed laser light. Moreover, the optical isolator 14$k$+1 may be an optical isolator that includes, as optical devices, a first retarder 43$k$+1, a polarizer 41$k$+1, and a second retarder 42$k$+1 disposed in this order from upstream to downstream in the optical path of pulsed laser light.

ASE light generated in the power amplifier 12$k$+1 may be randomly polarized light. A part of ASE light generated in the power amplifier 12$k$+1 and traveling upstream may enter the optical isolator 14$k$, and after a phase difference of 90° is provided to the ASE light by the second retarder 42$k$, the ASE light may enter the polarizer 42$k$. In the polarizer 42$k$, ASE light of an S-polarized component with respect to an incident surface of the polarizer 42$k$ of the ASE light having entered the polarizer 42$k$ may be reflected.

Moreover, a part of ASE light generated in the power amplifier 12$k$+1 and traveling downstream may enter the optical isolator 14$k$+1, and after a phase difference of 90° is provided to the ASE light by the first retarder 43$k$+1, the ASE light may enter the polarizer 41$k$+1. In the polarizer 41$k$+1, ASE light of an S-polarized component with respect to an incident surface of the polarizer 41$k$+1 of the ASE light having entered the polarizer 41$k$+1 may be reflected at high reflectivity.

Likewise, ASE light generated in the power amplifiers 12$k$−1 and 12$k$ may be randomly polarized light.

A part of the ASE light generated in the power amplifier 12$k$ and traveling downstream may enter the optical isolator 14$k$, and after a phase difference of 90° is provided to the ASE light by the first retarder 43$k$, ASE light of an S-polarized component with respect to an incident surface of the polarizer 41$k$ may be reflected at high reflectivity. A part of the ASE light generated in the power amplifier 12$k$ and traveling upstream may enter the optical isolator 14$k$−1, and after a phase difference of 90° is provided to the ASE light by the first retarder 43$k$–1, ASE light of an S-polarized component with respect to an incident surface of the polarizer 41$k$–1 may be reflected at high reflectivity. A part of the ASE light generated in the power amplifier 12$k$–1 and traveling downstream may enter the optical isolator 14$k$–1, and after a phase difference of 90° is provided to the ASE light by the first retarder 43$k$–1, ASE light of an S-polarized component with respect to the incident surface of the polarizer 41$k$–1 may be reflected at high reflectivity.

Thus, half of the ASE light generated in the power amplifiers 121, 122, . . . , 12$k$, . . . , and 12$n$ on the upstream side and downstream side may be separated from the optical path of pulsed laser light by the optical isolators 140, 141, 142, . . . , 14$k$, . . . , and 14$n$. Accordingly, power of the ASE light generated in the power amplifiers 121, 122, . . . , 12$k$, . . . , and 12$n$ on the upstream side and the downstream side may be reduced by half by the optical isolators 140, 141, 142, . . . , 14$k$, . . . , and 14$n$.

5.3 Action

In the laser apparatus illustrated in FIG. 4, even if pulsed laser light outputted from the MO 110 is reflected by the entrance windows and the exit windows in the power amplifiers 121, 122, . . . , 12$k$, . . . , and 12$n$, this reflected light may be prevented from returning to the upstream side. Moreover, even if a part of the pulsed laser light outputted from the MO 110 is reflected by the target in the chamber 2, this reflected light may be prevented from returning to the upstream side. Thus, such reflected light may be prevented from being amplified and returning to the upstream side.

Moreover, about half of the ASE light generated in the power amplifiers 121, 122, . . . , 12$k$, . . . , and 12$n$ may be separated from the optical path of pulsed laser light; therefore, self-oscillation may be suppressed.

It is to be noted that, in FIG. 4, a case where the polarizer 41 is a transmissive polarizer is described; however, the polarizer 41 is not limited to this example, and a reflective polarizer that reflects a polarized component in a selected one direction at high reflectivity and absorbs a polarized component in another direction orthogonal to the one direction subjected to suppression may be used. Moreover, in FIG. 4, a case where the retarder 42 is a transmissive λ/4 wavelength plate is described; however, the retarder 42 is not limited to this example. The retarder 42 may be a reflective retarder coated with a multilayer film that converts linearly polarized light into circularly polarized light and reflects the circularly polarized light at high reflectivity. Further, each of the power amplifiers 121, 122, . . . , 12$k$, . . . , and 12$n$ may be a triaxial orthogonal power amplifier or a high speed axial flow power amplifier.

5.4 Application Example

In FIG. 4, a laser apparatus with a configuration in which corresponding one of the optical isolators 141, 142, . . . , 14$k$, . . . , and 14$n$ is disposed between every adjacent two of the power amplifiers 121, 122, . . . , 12$k$, . . . , and 12$n$ is described. However, as illustrated in FIG. 6, optical isolators in the laser apparatus of the present disclosure may be so disposed that the respective optical isolators 140, . . . , 14$k$, . . . , and 14$n$ are placed between some of adjacent power amplifiers 121, 122, . . . , 12$k$, . . . , and 12$n$.

Figure 6:
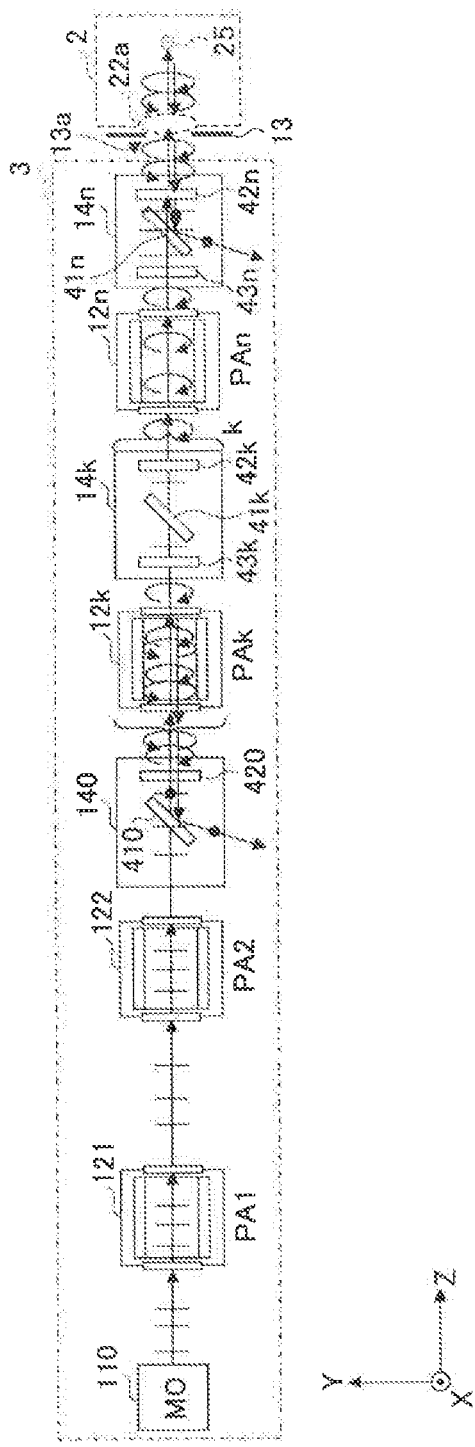
FIG. 6 is a configuration diagram of a laser apparatus including a plurality of optical isolators of the present disclosure.

More specifically, as illustrated in FIG. 6, the optical isolator 140 may be provided between the power amplifier 122 and an unillustrated power amplifier that is adjacent to the power amplifier 122 on the downstream side of the power amplifier 122 in the optical path of pulsed laser light. Moreover, the optical isolator 14$k$ may be provided between the power amplifier 12$k$ and an unillustrated power amplifier that is adjacent to the power amplifier 12$k$ on the downstream side of the power amplifier 12$k$ in the optical path of the pulsed laser light. The optical isolator 14$n$ may be provided between the amplifier 12$n$ and the chamber 2 in the optical path of the pulsed laser light. In this case, the power amplifiers 121 and 122 may be slab-type power amplifiers.

6. Laser Apparatus Including Optical Isolator Provided with Wavelength Filter and the Like Incidentally, the $CO_2$ laser apparatus configured of a combination of the MO and the plurality of PAs holds a possibility of causing self-oscillation by amplified spontaneous emission (ASE) outputted from the power amplifiers irrespective of a pulse outputted from the MO.

Figure 7:
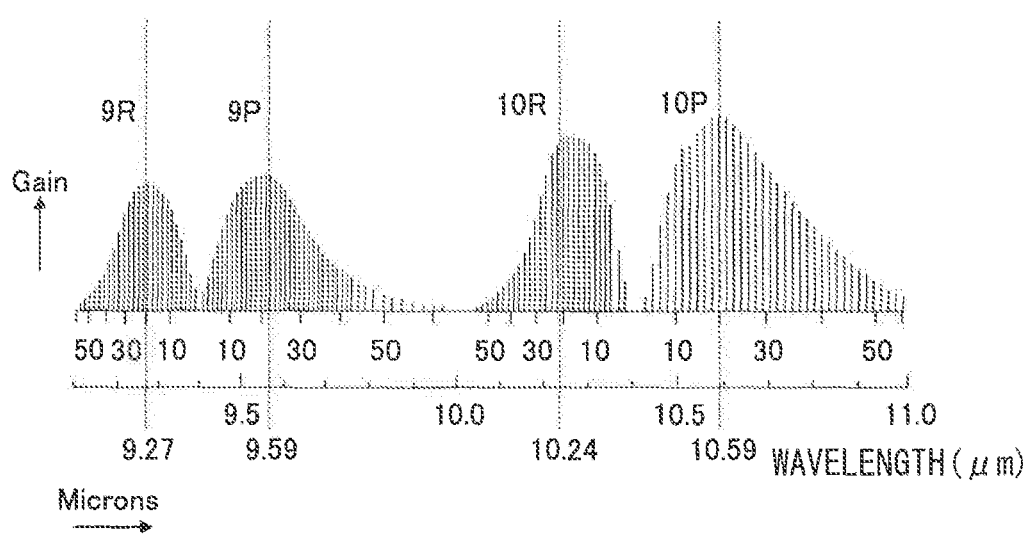
FIG. 7 is a relationship diagram between an amplification line and a gain in a case where $CO_2$ laser gas serves as a gain medium.

In other words, a gain medium of $CO_2$ laser gas is provided with a plurality of lines as illustrated in FIG. 7. More specifically, as light causing self-oscillation, there are four lines in a 9.27-μm wavelength band, a 9.59-μm wavelength band, a 10.24-μm wavelength band, and a 10.59-μm wavelength band. In a case where ASE light in these four lines is generated in a power amplifier to enter another power amplifier, when the ASE light in these four lines passes through another power amplifier, the ASE light may be amplified. Therefore, in the laser apparatus, ASE light in these four lines may be amplified to cause self-oscillation.

Here, the optical isolators 140, 141, 142, . . . , 14$k$, . . . , and 14$n$ include the respective polarizers 410, 411, 412, . . . , 41$k$, . . . , 41$n$ each of which allows P-polarized light to pass therethrough at high transmittance and reflects S-polarized light at high reflectivity. However, in a case of a polarizer that reflects S-polarized light of light in the 10.59-μm wavelength band and allows P-polarized light of the light in the 10.59-μm wavelength band at high reflectivity to pass therethrough at high transmittance, wavelength dependence is large; therefore, the polarizer may function as a polarizer only in a region near a predetermined wavelength, and may not function as a polarizer in a wavelength region other than the region near the predetermined wavelength. Therefore, it is difficult for the polarizer to reflect S-polarized light of light in all of the 9.27-μm wavelength band, the 9.59-μm wavelength band, the 10.24-μm wavelength band, and the 10.59-μm wavelength band at high reflectivity and allow P-polarized light of the light in all of the 9.27-μm wavelength band, the 9.59-μm wavelength band, the 10.24-μm wavelength band, and the 10.59-μm wavelength band to pass therethrough at high transmittance.

Therefore, even if the polarizers 410, 411, 412, . . . , 41$k$, . . . , and 41$n$ that reflect S-polarized light in the 10.59-μm wavelength band at high reflectivity are provided, they may not function as polarizers in the 9.27-μm wavelength band, the 9.59-μm wavelength band, and the 10.24-μm wavelength band. Accordingly, ASE light in at least one wavelength band line of the 9.27-μm wavelength band, the 9.59-μm wavelength band, and the 10.24-μm wavelength band may be amplified by a plurality of power amplifiers to cause self-oscillation.

Figure 8:
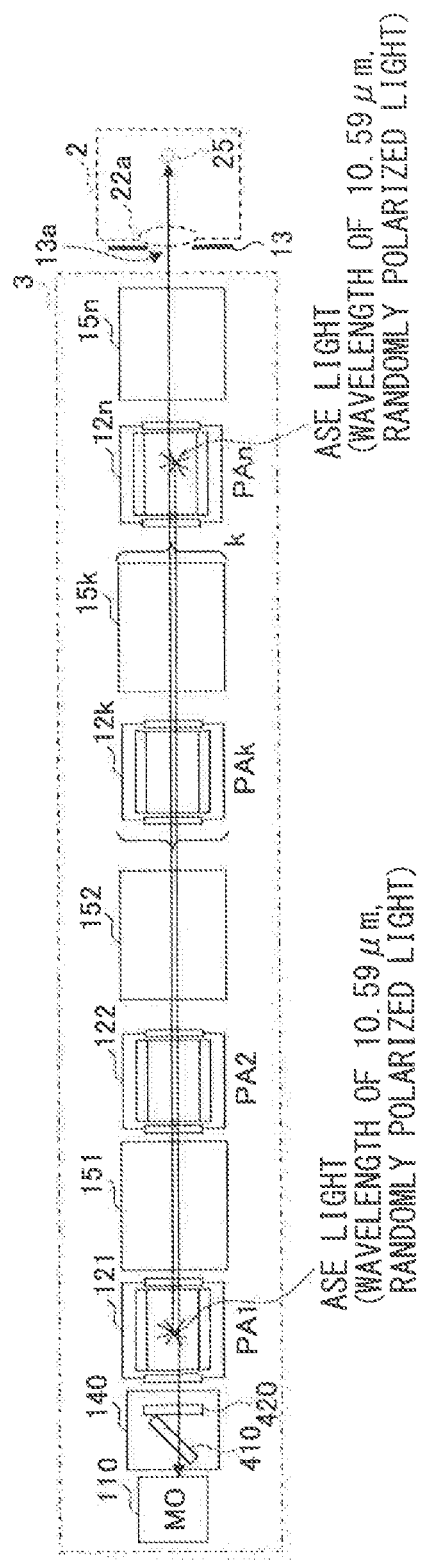
FIG. 8 is a configuration diagram of a laser apparatus including an optical isolator provided with a wavelength filter of the present disclosure.

6.1 Laser Apparatus Including Optical Isolator Provided with Wavelength Filter 6.1.1 Configuration As illustrated in FIG. 8, in the laser apparatus of the present disclosure, corresponding one of optical isolators 151, 152, . . . , and 15$k$ may be provided between every adjacent two of the power amplifiers 121, 122, . . . , 12$k$, . . . , and 12$n$ in the optical path of pulsed laser light. Moreover, the optical isolator 140 may be provided between the MO 110 and the power amplifier 121 in the optical path of the pulsed laser light. The optical isolator 15$n$ may be provided between the power amplifier 12$n$ and the laser light condensing optical system 22a in the chamber 2 in the optical path of the pulsed laser light.

Figure 9:
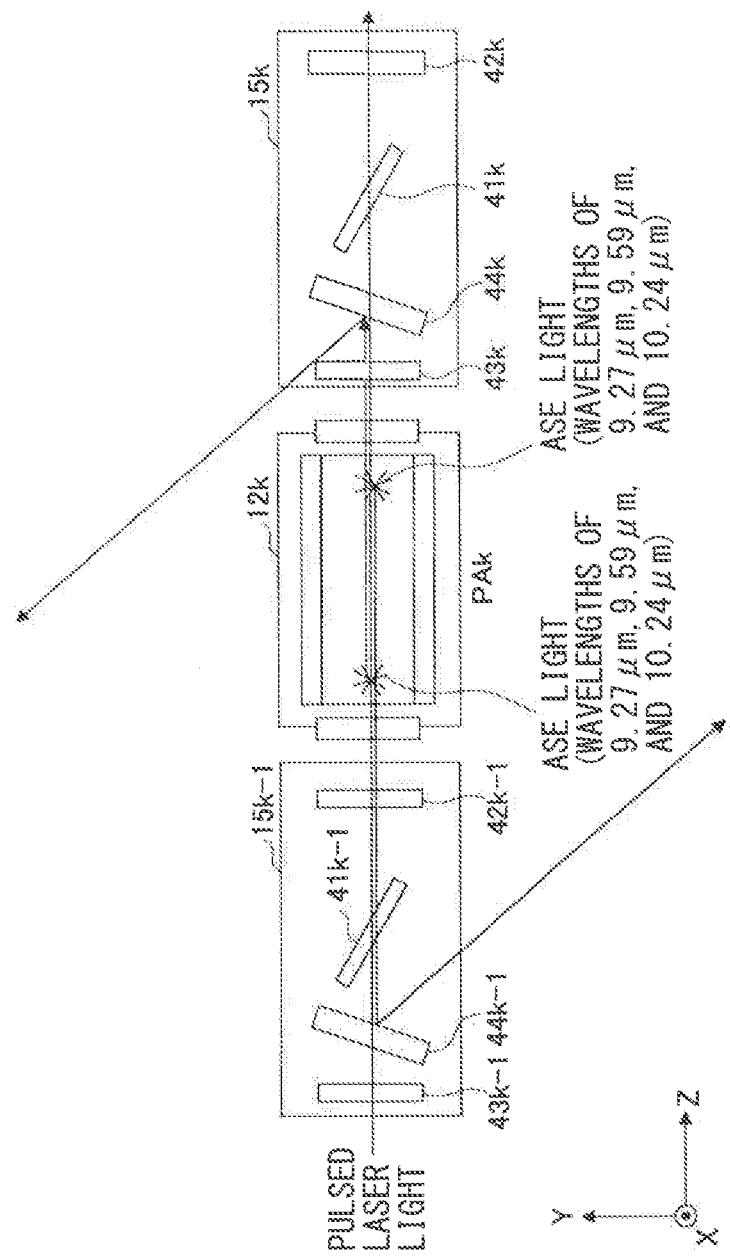
FIG. 9 is an explanatory diagram of the laser apparatus including the optical isolator provided with the wavelength filter of the present disclosure.

As illustrated in FIG. 9, the optical isolator 15k–1 and the optical isolator 15k may be provided on the upstream side and the downstream side of the power amplifier 12k in the optical path of the pulsed laser light, respectively. It is to be noted that, in this description, the optical isolators 15k–1 and 15k are described as an example; however, the optical isolators 151, 152, . . . , 15k, . . . , and 15n may be optical isolators with a similar configuration.

Each of the optical isolators 151, 152, . . . , 15k, . . . , and 15n may include a polarizer, a first retarder, a second retarder, and a wavelength filter disposed in the optical path of pulsed laser light outputted from the MO 110. Moreover, in each of the optical isolators 151, 152, . . . , 15k, . . . , and 15n, the first retarder, the wavelength filter, the polarizer, and the second retarder as optical devices may be disposed in this order from upstream to downstream in the optical path of the pulsed laser light.

More specifically, the optical isolator 15k–1 may include a first retarder 43k–1, a wavelength filter 44k–1, a polarizer 41k–1, and a second retarder 42k–1. The optical isolator 15k–1 may be an optical isolator including, as optical devices, the first retarder 43k–1, the wavelength filter 44k–1, the polarizer 41k–1, and the second retarder 42k–1 disposed in this order from upstream to downstream in the optical path of the pulsed laser light. In other words, the wavelength filter 44k–1 may be provided between the first retarder 43k–1 and the polarizer 41k–1 in the optical path of pulsed laser light outputted from the MO 110.

Moreover, the optical isolator 15k may include a first retarder 43k, a wavelength filter 44k, a polarizer 41k, and a second retarder 42k. The optical isolator 15k may include, as optical devices, the first retarder 43k, the wavelength filter 44k, the polarizer 41k, and the second retarder 42k disposed in this order from upstream to downstream in the optical path of pulsed laser light. In other words, the wavelength filter 44k may be provided between the first retarder 43k and the polarizer 41k in the optical path of pulsed laser light outputted from the MO 110.

Each of the wavelength filters 44k–1 and 44k may be a wavelength filter in which a substrate that allows $CO_2$ laser light to pass therethrough is coated with a film that allows light in the 10.59-μm wavelength band entering at an incident angle of near 5° to pass therethrough at high transmittance and reflects light in the 9.27-μm wavelength band, the 9.59-μm wavelength band, and the 10.24-μm wavelength band at high reflectivity. A wavelength of the pulsed laser light outputted from the MO 110 may be in the 10.59-μm wavelength band. A material of the substrate that allows the $CO_2$ laser light to pass therethrough in each of the wavelength filters 44k–1 and 44k may be ZnSe, GaAs, diamond, or the like.

6.1.2 Operation

ASE light in the 9.27-μm wavelength band, the 9.59-μm wavelength band, and 10.24-μm wavelength band generated in the power amplifier 12k may travel upstream and downstream from the power amplifier 12k.

ASE light traveling downstream from the power amplifier 12k, i.e., toward the same direction as the traveling direction of pulsed laser light serving as seed light may enter the optical isolator 15k. The ASE light having entered the optical isolator 15k may pass through the first retarder 43k, and then may be reflected at high reflectivity by the wavelength filter 44k. At this time, since pulsed laser light passes through the wavelength filter 44k at high transmittance, the pulsed laser light may pass through the optical isolator 15k at high transmittance to enter the power amplifier 12k and the next power amplifier adjacent to the power amplifier 12k on the downstream side of the power amplifier 12k.

On the other hand, ASE light traveling upstream from the amplifier 12k, i.e., toward a direction opposite to the traveling direction of pulsed laser light serving as seed light may enter the optical isolator 15k–1. The ASE light having entered the optical isolator 15k–1 may pass through the second retarder 42k–1, and light having passed through the polarizer 41k–1 at high transmittance may be reflected at high reflectivity by the wavelength filter 44k–1.

6.1.3 Action

The ASE light in the 9.27-μm wavelength band, the 9.59-μm wavelength band, and the 10.24-μm wavelength band generated in the power amplifier 12k may be prevented by the wavelength filters 44k–1 and 44k from entering power amplifiers adjacent to the power amplifier 12k on the upstream side and the downstream side of the power amplifier 12k. Thus, self-oscillation by the ASE light in the 9.27-μm wavelength band, the 9.59-μm wavelength band, and the 10.24-μm wavelength band may be suppressed.

6.1.4 Others

In the description in FIG. 9, the wavelength filters 44k–1 and 44k in a case where the pulsed laser light outputted from the MO 110 is in the 10.59-μm wavelength band are described; however, the wavelength filters 44k–1 and 44k are not limited thereto. For example, in a case where the pulsed laser light outputted from the MO 110 is in the 10.24-μm wavelength band, the wavelength filters 44k–1 and 44k may support for the 10.24-μm wavelength band. More specifically, there may be provided the wavelength filters 44k–1 and 44k each of which allows light in the 10.24-μm wavelength band to pass therethrough at high transmittance and reflects light in the 9.27-μm wavelength band, the 9.59-μm wavelength band, and the 10.59-μm wavelength band at high reflectivity.

Moreover, in a case where the pulsed laser light outputted from the MO 110 is in the 9.59-μm wavelength band, the wavelength filters 44k–1 and 44k may support for the 9.59-μm wavelength band. More specifically, there may be provided the wavelength filters 44k–1 and 44k each of which allows light in the 9.59-μm wavelength band to pass therethrough at high transmittance and reflects light in the 9.27-μm wavelength band, the 10.24-μm wavelength band, and the 10.59-μm wavelength band at high reflectivity.

Further, in a case where the pulsed laser light outputted from the MO 110 is in the 9.27-μm wavelength band, the wavelength filters 44k–1 and 44k may support for the 9.27-μm wavelength band. More specifically, there may be provided the wavelength filters 44k–1 and 44k each of which allows light in the 9.27-μm wavelength band to pass therethrough at high transmittance and reflects light in the 9.59-μm wavelength band, the 10.24-μm wavelength band, and the 10.59-μm wavelength band at high reflectivity.

In FIG. 9, as the wavelength filters 44k–1 and 44k, optical devices in which a substrate allowing laser light to pass therethrough is coated with a multilayer film in a case where an incident angle of 5° is described; however, the wavelength filters 44k–1 and 44k are not limited thereto. The wavelength filters may be a wavelength selection device such as a grating or an air-gap etalon.

Moreover, in a case where the polarizers 41k–1, 41k, and the like are capable of also serving as a wavelength filter, the wavelength filter 44k–1, 44k, and the like may not be provided. More specifically, an example of such a polarizer may be a polarizer that reflects P-polarized light and S-polarized light in the 9.27-μm wavelength band, the 9.59-μm wavelength band, and the 10.24-μm wavelength band, and S-polarized light in the 10.59-μm wavelength band at high reflectivity and allows P-polarized light in the 10.59-μm wavelength band to pass therethrough at high transmittance.

Further, each of the wavelength filters 44k–1 and 44k may be configured of a combination of a plurality of polarizers. Furthermore, the wavelength filters 44k–1 or 44k may be disposed at any position in the optical path between the power amplifier 12k and the power amplifier 12k+1 adjacent to the power amplifier 12k or between the power amplifier 12k–1 and the power amplifier 12k. MO 110 may be a laser that oscillates on a single line, or a laser oscillator that oscillates on a plurality of lines (for example, P(22), P(20), P(18), P(16), and the like) in the 10.59-μm wavelength band. Moreover, the MO 110 may include a plurality of single longitudinal mode quantum cascade lasers that oscillate on these lines, and may be configured to multiplex the respective lines by a grating.

6.2 Laser Apparatus Including Optical Isolator Provided with Spatial Filter and Wavelength Filter Incidentally, in the laser apparatus including the optical isolator illustrated in FIG. 9, ASE light in the 10.59-μm wavelength band generated in the power amplifier 12k or the like may be amplified by a power amplifier provided upstream of the power amplifier 12k to enter the MO 110 in some cases. When the amplified ASE light enters the MO 110 in such a manner, breakage or the like of the MO 110 may be caused.

Moreover, ASE light in the 10.59-μm wavelength band generated in the power amplifier 12k or the like may be amplified by another power amplifier provided downstream of the power amplifier 12k in some cases. When such self-oscillation occurs, pulsed laser light outputted from the MO 110 is not allowed to be amplified with predetermined energy or a predetermined pulse width; therefore, EUV light with desired energy may not be obtained.

6.2.1 Configuration

Figure 10:
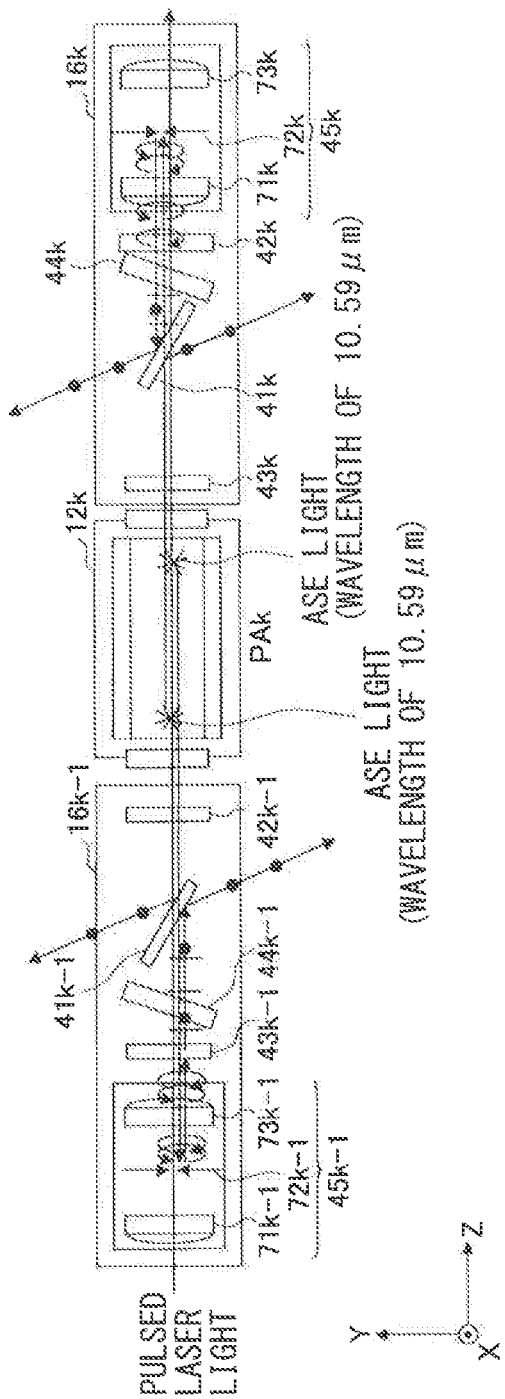
FIG. 10 is an explanatory diagram of a laser apparatus including an optical isolator provided with a spatial filter and a wavelength filter of the present disclosure.

The laser apparatus of the present disclosure may use optical isolators 16k–1 and 16k with a configuration illustrated in FIG. 10 instead of the optical isolators 151, 152, . . . , 15k, . . . , and 15n illustrated in FIG. 8. As illustrated in FIG. 10, each of the optical isolators 16k–1 and 16k may include a polarizer, a first retarder, a second retarder, a wavelength filter, and a spatial filter disposed in the optical path of the pulsed laser light outputted from the MO 110.

More specifically, the optical isolator 16k–1 may include a spatial filter 45k–1, the first retarder 43k–1, the wavelength filter 44k–1, the polarizer 41k–1, and the second retarder 42k–1. The optical isolator 16k–1 may include the spatial filter 45k–1, the first retarder 43k–1, the wavelength filter 44k–1, the polarizer 41k–1, and the second retarder 42k–1 disposed in this order from upstream to downstream in the optical path of the pulsed laser light. In other words, the spatial filter 45k–1 may be provided between a power amplifier adjacent to the power amplifier 12k on the upstream side of the power amplifier 12k and the first retarder 43k–1 in the optical path of the pulsed laser light.

Moreover, the optical isolator 16k may include the first retarder 43k, the polarizer 41k, the wavelength filter 44k, the second retarder 42k, and a spatial filter 45k. The optical isolator 16k may include the first retarder 43k, the polarizer 41k, the wavelength filter 44k, the second retarder 42k, and the spatial filter 45k disposed in this order from upstream to downstream in the optical path of the pulsed laser light. In other words, the spatial filter 45k may be provided between a power amplifier adjacent to the power amplifier 12k on the downstream side of the power amplifier 12k and the second retarder 42k in the optical path of the pulsed laser light.

The spatial filter 45k–1 may be a spatial filter that includes, as optical devices, a first condensing lens 71k–1, a pinhole plate 72k–1, and a second condensing lens 73k–1 disposed in this order from upstream to downstream in the optical path of the pulsed laser light. The pinhole plate 72k–1 may be so disposed as to allow focal points of the first condensing lens 71k–1 and the second condensing lens 73k–1 to coincide with each other and as to place a pinhole provided on the pinhole plate 72k–1 in a position where the focal points coincide with each other. A diameter of the pinhole provided on the pinhole plate 72k–1 may be substantially equal to a diameter corresponding to $M^2$ of pulsed laser light.

The spatial filter 45k may be a spatial filter that includes a first condensing lens 71k, a pinhole plate 72k, and a second condensing lens 73k disposed in this order from upstream to downstream in the optical path of the pulsed laser light. The pinhole plate 73k may be so disposed as to allow focal points of the first condensing lens 71k and the second condensing lens 73k to coincide with each other and as to place a pinhole provided on the pinhole plate 72k in a position where the focal points coincide with each other. A diameter of the pinhole provided on the pinhole plate 72k may be substantially equal to the diameter corresponding to $M^2$ of pulsed laser light.

It is to be noted that, as illustrated in FIG. 10, the optical isolator 16k–1 and the optical isolator 16k may be so disposed as to symmetrically arrange the spatial filters, the first retarders, the wavelength filters, the polarizers, and the second retarders in the optical isolator 16k–1 and the optical isolator 16k with respect to the power amplifier 12k as a center.

6.2.2 Operation

Randomly polarized ASE light in the 10.59 μm wavelength band generated in the power amplifier 12k may travel upstream and downstream from the power amplifier 12k.

The randomly polarized ASE light, in the 10.59-μm wavelength band traveling upstream, of the ASE light generated in the power amplifier 12k may enter the optical isolator 16k–1. The ASE light having entered the optical isolator 16k–1 may enter the polarizer 41k–1 after a phase difference of 90° is provided to the ASE light by the second retarder 42k–1, and an S-polarized component with respect to the incident surface of the polarizer 41k–1 of the ASE light may be reflected at high reflectivity by the polarizer 41k–1, and a P-polarized component of the ASE light may pass through the polarizer 41k–1 at high transmittance.

Linearly polarized ASE light in the Y direction having passed through the polarizer 41k–1 may pass through the wavelength filter 44k–1 at high transmittance to pass through the first retarder 43k–1, thereby being converted into circularly polarized ASE light. After that, the ASE light converted into circularly polarized light may enter the spatial filter 45k–1, and may be condensed by the second condensing lens 73k–1 in the spatial filter 45k–1. In general, since a beam spread angle of ASE light is wide, light passing through the pinhole in the pinhole plate 72k–1 is very little, and most of the ASE light may be reflected by a surface of the pinhole plate 72k–1. The ASE light thus reflected by the surface of the pinhole plate 72k–1 may be converted into circularly polarized light in a reverse direction of the ASE light having entered the surface of the pinhole plate 72k–1.

The ASE light converted into reverse-circularly polarized light in such a manner may be converted into linearly polarized light in the X direction again by the first retarder 43k–1 through the second lens 73k–1. The ASE light converted into the linearly polarized light in the X direction in such a manner may pass through the wavelength filter 44k–1 at high transmittance, and then may enter the polarizer 41k–1 as S-polarized light, and may be reflected by the polarizer 41k–1 at high reflectivity.

Moreover, randomly polarized ASE light, in the 10.59-μm wavelength band traveling downstream, of the ASE light generated in the power amplifier 12k may enter the optical isolator 16k. The ASE light having entered the optical isolator 16k may enter the polarizer 41k after a phase difference of 90° is provided to the ASE light by the first retarder 43k, and an S-polarized component with respect to the incident surface of the polarizer 41k of the ASE light may be reflected at high reflectivity by the polarizer 41k and a P-polarized component of the ASE light may pass through the polarizer 41k at high transmittance.

Linearly polarized ASE light in the Y direction having passed through the polarizer 41k may pass through the wavelength filter 44k at high transmittance to pass through the second retarder 43k, thereby being converted into circularly polarized ASE light. After that, the ASE light converted into circularly polarized light may enter the spatial filter 45k, and may be condensed by the first condensing lens 71k in the spatial filter 45k. In general, since the beam spread angle of ASE light is wide, light passing through the pinhole in the pinhole plate 72k is very little, and most of the ASE light may be reflected by a surface of the pinhole plate 72k. The ASE light thus reflected by the surface of the pinhole plate 72k may be converted into circularly polarized light in a reverse direction of the ASE light having entered the surface of the pinhole plate 72k.

The ASE light converted into reverse-circularly polarized light in such a manner may be converted into linearly polarized light in the X direction again by the second retarder 42k through the first lens 71k. The ASE light converted into the linearly polarized light in the X direction in such a manner may pass through the wavelength filter 44k at high transmittance, and then may enter the polarizer 41k as S-polarized light, and may be reflected by the polarizer 41k at high reflectivity.

It is to be noted that, since a beam spread angle of the pulsed laser light outputted from the MO 110 is extremely narrow, the pulsed laser light may pass through the pinhole on the pinhole plate 72k of the spatial filter 45k. Therefore, the pulsed laser light may pass through the optical isolator 16k to enter the next power amplifier adjacent to the power amplifier 12k on the downstream side of the power amplifier 12k.

6.2.3 Action

A beam spread angle of ASE light in the 10.59-μm wavelength band generated in the power amplifier 12k or the like may be wider than that of laser light that oscillates by a laser oscillator, i.e., the pulsed laser light outputted from the MO 110.

Therefore, with use of the spatial filters 45k–1, 45k, and the like, pulsed laser light may pass through at high transmittance, and transmission of ASE light in the 10.6-μm wavelength band with a wide beam spread angle may be suppressed.

Moreover, according to the optical isolators 16k–1, 16k, and the like, ASE light reflected by the spatial filters 45k–1 and 45k may be reflected at high reflectivity by the polarizers 41k–1 and 41k to be separated from the optical path of pulsed laser light. Accordingly, ASE light may be prevented from entering the power amplifier 12k and the like again and being amplified.

6.2.4 Others

The spatial filters 45k–1, 45k, and the like illustrated in FIG. 10 are configured of respective combinations of the first condensing lenses 71k–1 and 71k, the pinhole plates 72k–1 and 72k, and the second condensing lenses 73k–1 and 73k, but are not limited thereto.

Figure 11:
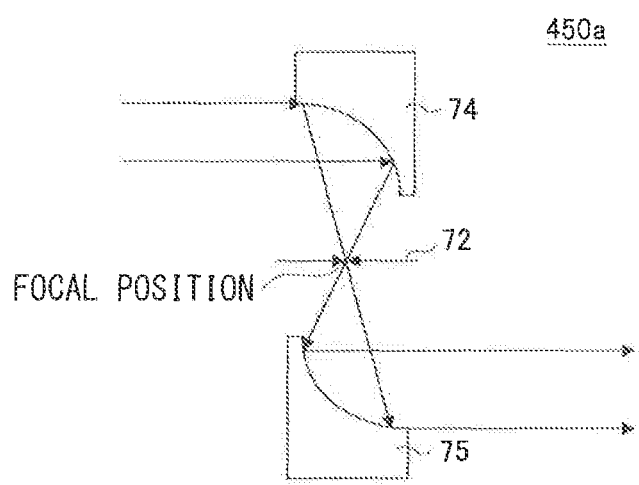
FIG. 11 is a configuration diagram of another spatial filter.

For example, as illustrated in FIG. 11, a spatial filter 450a may be a spatial filter configured of a combination of two off-axis parabolic mirrors 74 and 75, and a pinhole plate 72. The spatial filter 450a may be used instead of the spatial filters 45k–1, 45k, and the like. In particular, in a case where energy of pulsed laser light is high, the reflective spatial filter 450a with a configuration illustrated in FIG. 11 may be preferable. In a case of a transmissive spatial filter such as the spatial filters 45k–1, 45k, and the like illustrated in FIG. 10, the first condensing lens or the second condensing lens may be heated by pulsed laser light to cause deformation thereof or change in refractive index thereof, thereby displacing focal positions thereof. However, in a case of the reflective spatial filter 450a illustrated in FIG. 11, cooling water is allowed to flow on back surfaces of the off axis parabolic mirrors 74 and 75; therefore, deformation or the like in a mirror surface may be suppressed, and displacement of the focal position may be suppressed.

Moreover, in FIG. 10, a case where the optical devices in the optical isolator 16k–1 and the optical devices in the optical isolator 16k are symmetrically arranged with respect to the amplifier 12k as a center is described. However, the arrangement of the optical devices in the optical isolator 16k–1 and the arrangement of the optical devices in the optical isolator 16k may be the same as each other.

Further, in FIG. 10, the optical isolators 16k–1 and 16k with respective configurations in which the wavelength filters 44k–1 and 44k are provided are described; however, the optical isolators 16k–1 and 16k are not limited to this embodiment. For example, most of ASE light with a wide beam spread angle is reflected by the spatial filters 45k–1 and 45k; therefore, even if the wavelength filters 44k–1 and 44k are not provided, the ASE light may be removed to some extent.

Figure 12:
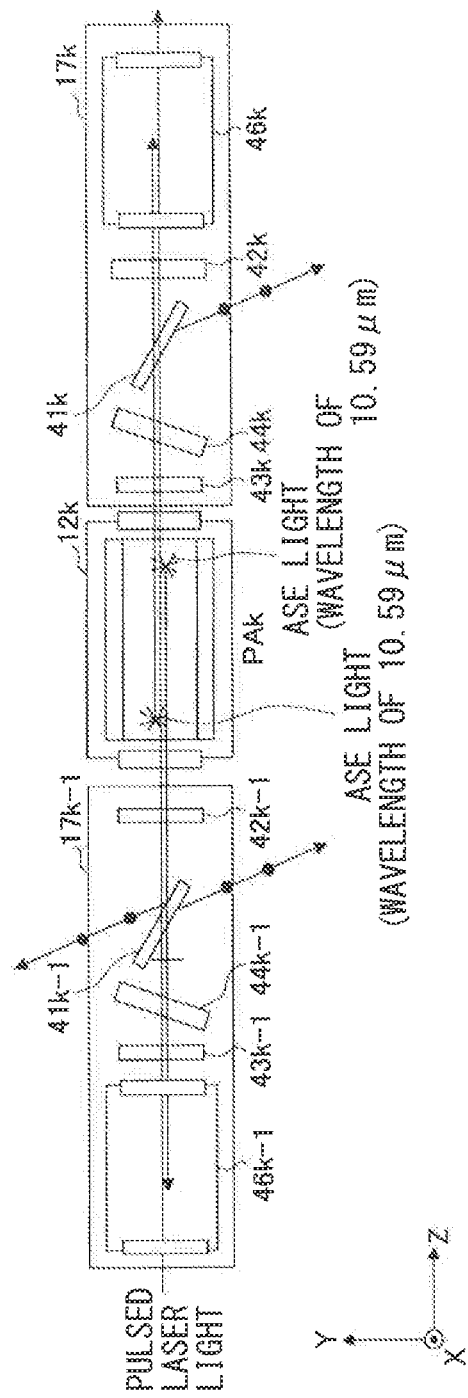
FIG. 12 is an explanatory diagram of a laser apparatus including an optical isolator provided with a saturable absorption gas cell and a wavelength filter of the present disclosure.

6.3 Laser Apparatus Including Optical Isolator Provided with Saturable Absorption Gas Cell and Wavelength Filter 6.3.1 Configuration The laser apparatus of the present disclosure may use optical isolators 17k–1 and 17k illustrated in FIG. 12 instead of the optical isolators 151, 152, . . . , 15k, . . . , and 15n illustrated in FIG. 8. As illustrated in FIG. 12, each of the optical isolators 17k–1 and 17 may include a polarizer, a first retarder, a second retarder, a wavelength filter, and a saturable absorption gas cell disposed in the optical path of pulsed laser light.

More specifically, the optical isolator 17k–1 may include a saturable absorption gas cell 46k–1, the first retarder 43k–1, the wavelength filter 44k–1, the polarizer 41k–1, and the second retarder 42k–1. The optical isolator 17k–1 may be an optical isolator including, as optical devices, the saturable absorption gas cell 46k–1, the first retarder 43k–1, the wavelength filter 44k–1, the polarizer 41k–1, and the second retarder 42k–1 disposed in this order from upstream to downstream in the optical path of pulsed laser light. In other words, the saturable absorption gas cell 46k–1 may be provided between a power amplifier adjacent to the power amplifier 12k on the upstream side of the power amplifier 12k and the first retarder 43k–1 in the optical path of the pulsed laser light.

Moreover, the optical isolator 17k may include the first retarder 43k, the wavelength filter 44k, the polarizer 41k, the second retarder 42k, and a saturable absorption gas cell 46k. The optical isolator 17k may be an optical isolator including, as optical devices, the first retarder 43k, the wavelength filter 44k, the polarizer 41k, the second retarder 42k, and the saturable absorption gas cell 46k disposed in this order from upstream to downstream in the optical path of the pulsed laser light. In other words, the saturable absorption gas cell 46k may be provided between a power amplifier adjacent to the power amplifier 12k on the downstream side of the power amplifier 12k and the second retarder 42k in the optical path of the pulsed laser light.

Each of the saturable absorption gas cells 46k-1 and 46k may include an entrance window, an exit window, and a gas chamber, and saturable absorption gas may be contained in the gas chamber. As the saturable absorption gas, in the 10.59-μm wavelength band, any of $SF_6$, $N_2F_4$, $PF_5$, $CH_3CHF_2$, $CO_2$ (hot $CO_2$), or gas including any of them may be used. Moreover, in the 9.59-μm wavelength band, any of $CH_3OH$, $CH_3F$, HCOOH, $CD_3OD$, $CD_3F$, and DCOOD (D: hydrogen), or gas including any of them may be used. In the 9.27-μm wavelength band, $C_2F_2Cl$ or gas including $C_2F_2Cl$ may be used. Further, as buffer gas, $N_2$ gas or He gas may be included. It is to be noted that the saturable absorption gas corresponding to a wavelength band of pulsed laser light outputted from the MO 110 may be selected. A concentration and pressure of the saturable absorption gas may be so set as to allow pulsed laser light to pass though the saturable absorption gas at high transmittance and as to absorb ASE light with lower light intensity than that of the pulsed laser light.

6.3.2 Operation

Randomly polarized ASE light in the 10.59-μm wavelength band generated in the power amplifier 12k may travel upstream and downstream from the power amplifier 12k.

The randomly polarized ASE light, in the 10.59-μm wavelength band traveling upstream, of the ASE light generated in the power amplifier 12k may enter the optical isolator 17k-1. The ASE light having entered the optical isolator 17k-1 may enter the polarizer 41k-1 after a phase difference of 90° is provided to the ASE light by the second retarder 42k-1, and an S-polarized component with respect to the incident surface of the polarizer 41k-1 of the ASE light may be reflected at high reflectivity by the polarizer 41k-1 and a P-polarized component of the ASE light may pass through the polarizer 41k-1 at high transmittance.

Linearly polarized ASE light in the Y direction having passed through the polarizer 41k-1 may pass through the wavelength filter 44k-1 at high transmittance and pass through the first retarder 43k-1, thereby being converted into circularly polarized ASE light. After that, the ASE light converted into circularly polarized light may enter the saturable absorption gas cell 46k-1. The light intensity of the ASE Light is lower than that of the pulsed laser light; therefore, the ASE light may be absorbed by the saturable absorption gas cell 46k-1.

Moreover, the randomly polarized ASE light, in the 10.59-μm wavelength band traveling downstream, of the ASE light generated in the power amplifier 12k may enter the optical isolator 17k. The ASE light having entered the optical isolator 17k may pass through the wavelength filter 44k at high transmittance after a phase difference of 90° is provided to the ASE light by the first retarder 43k, and an S-polarized component with respect to the incident surface of the polarizer 41k of the ASE light may be reflected by the polarizer 41k at high reflectivity, and a P-polarized component of the ASE light may pass through the polarizer 41k at high transmittance.

The P-polarized ASE light having passed through the polarizer 41k may pass through the second retarder 42k, thereby being converted into circularly polarized ASE light. After that, the ASE light converted into circularly polarized light may enter the saturable absorption gas cell 46k. Since the light intensity of the ASE light is lower than that of the pulsed laser light, the ASE light may be absorbed by the saturable absorption gas cell 46k.

It is to be noted that the light intensity of the pulsed laser light traveling downstream from the power amplifier 12k or the like is much higher than that of the ASE light; therefore, the pulsed laser light may pass through the saturable absorption gas cell 46k at high transmittance to enter the next power amplifier adjacent to the amplifier 12k or the like on the downstream side of the amplifier 12k or the like.

6.3.3 Action

The saturable absorption gas in the saturable absorption gas cells 46k-1 and 46k allows light with predetermined light intensity or higher to pass therethrough at high transmittance, and is high in absorptance for light with predetermined light intensity or lower. Therefore, while the saturable absorption gas allows pulsed laser light to pass therethrough at high transmittance, transmission of ASE light with a wavelength equal to that of the pulsed laser light, i.e., in the 10.59-μm wavelength band may be suppressed. Accordingly, self-oscillation by the ASE light in the 10.59-μm wavelength band may be suppressed.

It is to be noted that, as illustrated in FIG. 12, a case where the wavelength filter 44k-1 is provided in the optical isolator 17k-1, and the wavelength filter 44k is provided in the optical isolator 17k is described above. However, the saturable absorption gas cell 46k-1 is provided in the optical isolator 17k-1, and the saturable absorption gas cell 46k is provided in the optical isolator 17k; therefore, ASE light may be absorbed in the saturable absorption gas cells 46k-1 and 46k. As the saturable absorption gas in this case, gas or mixed gas that functions as a saturable absorber for wavelengths in the 9.27-μm wavelength band, 9.59-μm wavelength band, the 10.24-μm wavelength band, and the 10.59-μm wavelength band may be used. In this case, even if the wavelength filters 44k-1 and 44k are not provided, a similar effect may be obtained.

Figure 13:
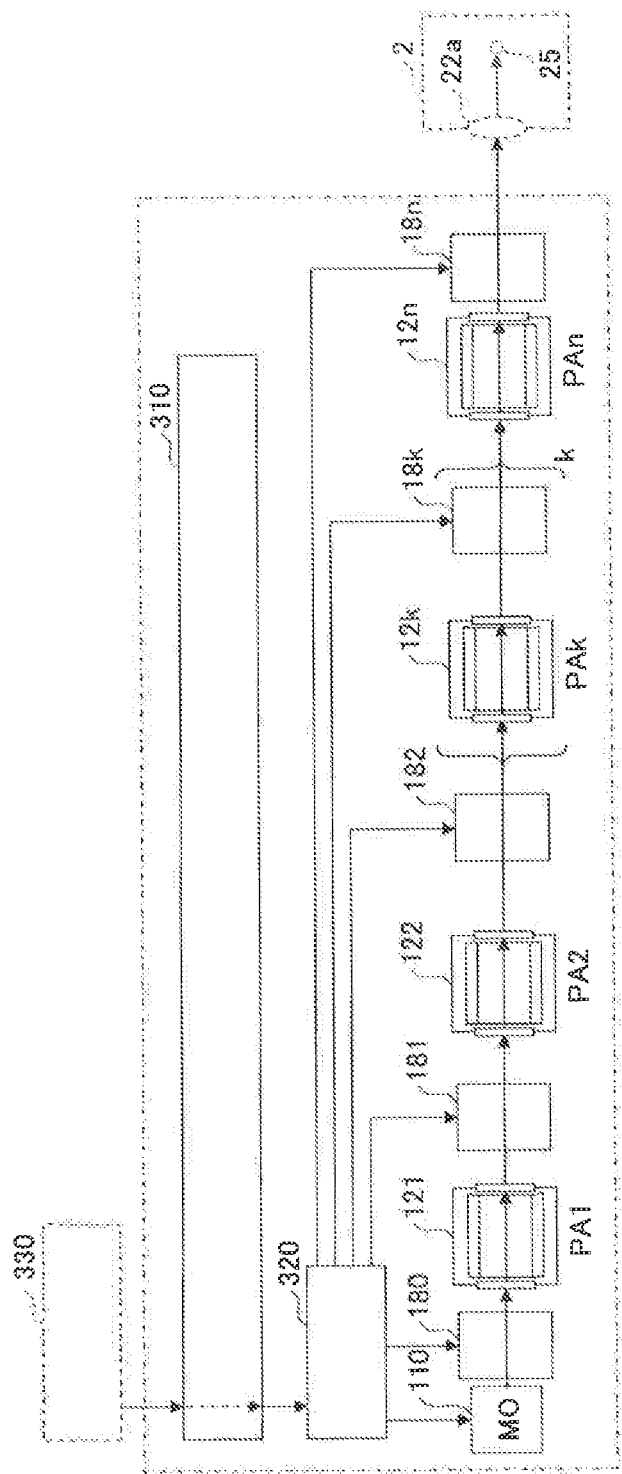
FIG. 13 is an explanatory diagram of a laser apparatus including an optical isolator provided with an EO Pockels cell and a wavelength filter of the present disclosure.

6.4 Laser Apparatus Including Optical Isolator Provided with EO Pockels Cell and Wavelength Filter 6.4.1 Configuration As illustrated in FIG. 13, an optical isolator 180 may be provided between the MO 110 and the power amplifier 121 in the optical path of pulsed laser light. Moreover, corresponding one of optical isolators 181, 182, . . . , 18k, and the like may be provided between every adjacent two of the power amplifiers 121, 122, . . . , 12k, . . . , and 12n in the optical path of the pulsed laser light. An optical isolator 18n may be provided between the power amplifier 12n and the laser light condensing optical system 22a in the chamber 2 in the optical path of the pulsed laser light. It is to be noted that all of the optical isolators 181, 182, . . . , 18k, . . . , and 18n may be optical isolators with a same configuration.

Figure 14:
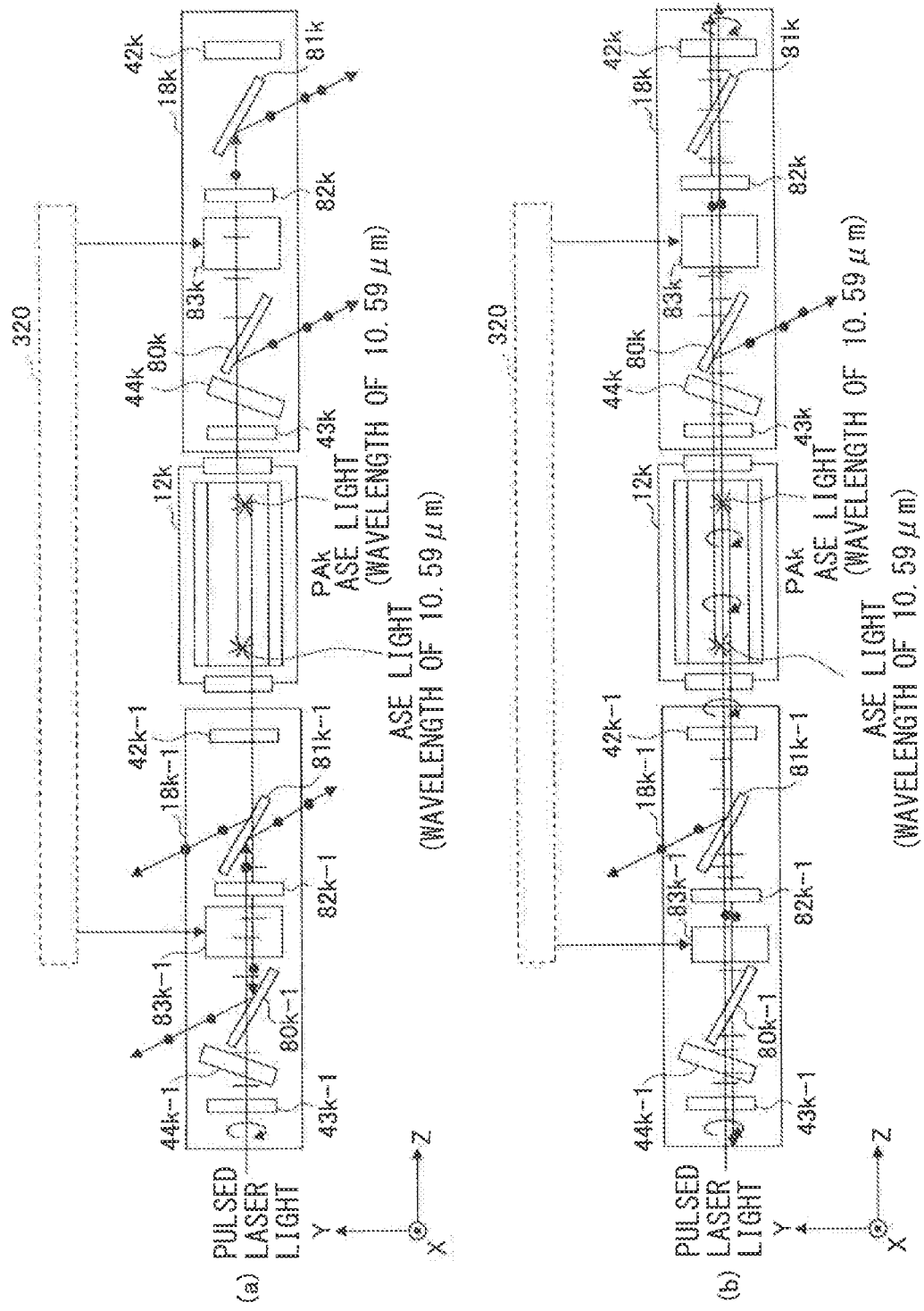
FIG. 14 is an explanatory diagram of the optical isolator provided with the EO Pockels cell and the wavelength filter.

For example, as illustrated in FIG. 14, an optical isolator 18k-1 and the optical isolator 18k may be provided on the upstream side and the downstream side of the power amplifier 12k in the optical path of the pulsed laser light, respectively. The optical isolator 18k may include the wavelength filter 44k, a first polarizer 80k, a second polarizer 81k, the first retarder 43k, the second retarder 42k, a third retarder 82k, and an EO Pockels cell 83k. Likewise, the optical isolator 18k-1 may include the wavelength filter 44k-1, a first polarizer 80k-1, a second polarizer 81k-1, the first retarder 43$k$–1, the second retarder 42$k$–1, a third retarder 82$k$–1, and an EO Pockels cell 83$k$–1. It is to be noted that FIG. 14($a$) illustrates a state in which a voltage is not applied to the EO Pockels cell 83$k$ and the like, and FIG. 14($b$) illustrates a state in which a voltage is applied to the EO Pockels cell 83$k$ and the like. However, the optical isolator 180 may be an optical isolator that is the optical isolator 18$k$–1 illustrated in FIG. 14 without the first retarder 43$k$–1.

Moreover, as illustrated in FIG. 13, the laser apparatus may include a laser control section 310 and a control circuit 320. The laser control section 310 may be connected to an external apparatus such as an EUV light generation system control section 330. The laser control section 310 and the control circuit 320 may be connected to each other. The control circuit 320 may be connected to the MO 110 and the optical isolators 180, 181, 182, . . . , 18$k$, . . . , and 18$n$.

The control circuit 320 may be connected to unillustrated power supplies that drive the respective EO Pockels cells 83$k$–1, 83$k$, and the like in the optical isolator 180, 181, 182, . . . , 18$k$, . . . , and 18$n$.

The optical isolator 18$k$ may include the first retarder 43$k$, the first polarizer 80$k$, the EO Pockels cell 83$k$, the third retarder 82$k$, the second polarizer 81$k$, and the second retarder 42$k$ disposed in this order from upstream to downstream in the optical path of the pulsed laser light. The wavelength filter 44$k$ may be disposed in any position in the optical path of the pulsed laser light. Moreover, the optical isolator 18$k$–1 may include the first retarder 43$k$–1, the first polarizer 80$k$–1, the EO Pockels cell 83$k$–1, the third retarder 82$k$–1, the second polarizer 81$k$–1, and the second retarder 42$k$–1 disposed in this order from upstream to downstream in the optical path of the pulsed laser light. The wavelength filter 44$k$–1 may be disposed in any position in the optical path of the pulsed laser light. It is to be noted that the second polarizers 81$k$–1, 81$k$, and the like illustrated in FIGS. 13 and 14 may be the same wavelength filters as the polarizers 41$k$ and the like illustrated in FIG. 8 and the like.

The first polarizer 80$k$ and the like and the second polarizer 81$k$ and the like may be polarizers that reflect S-polarized light at high reflectivity and allow P-polarized light to pass therethrough at high transmittance.

Each of the EO Pockels cell 83$k$ and the like may be an EO Pockels cell that includes an electro-optic crystal, a pair of electrodes in contact with the electro-optic crystal, and a high-voltage supply, and is controlled to change a phase of entered light to 180° when a predetermined voltage is applied between the pair of electrodes by the high-voltage supply. Examples of such an electro-optic crystal may include CdTe crystal, GaAs crystal, and the like that are capable of being used in a wavelength band of a $CO_2$ laser.

Each of the third retarder 82$k$–1, 82$k$, and the like may be a $\lambda$/2 plate that provides a phase difference of 180°, i.e., a phase difference of ½ wavelength. Each of the third retarder 82$k$–1, 82$k$, and the like may be so disposed as to set a slow axis thereof at 45° with respect to linearly polarized light when the linearly polarized light enters.

6.4.2 Operation

First, for example, a case where both the EO Pockels cell 83$k$–1 and the EO Pockels cell 83$k$ are off will be described below with reference to FIG. 14($a$).

Randomly polarized ASE light with a wavelength of 10.59 μm generated in the power amplifier 12$k$ may travel toward a direction where the optical isolator 18$k$–1 is provided on the upstream side of the power amplifier 12$k$.

The ASE light having entered the optical isolator 18$k$–1 may enter the second polarizer 81$k$–1 after a phase difference of 90° is provided to the ASE light by the second retarder 42$k$–1. ASE light of an S-polarized component with respect to an incident surface of the second polarizer 81$k$–1 may be reflected at high reflectivity by the second polarizer 81$k$–1, and ASE light of a P-polarized component may pass through the second polarizer 81$k$–1 at high transmittance.

The ASE light having passed through the second polarizer 81$k$–1 is linearly polarized light in the Y direction; therefore, the ASE light may enter the third retarder 82$k$–1. The linearly polarized ASE light in the Y direction may be converted into linearly polarized light in the X direction by the third retarder 82$k$–1. The ASE light converted into linearly polarized light in the X direction in such a manner may pass as it is through the EO Pockels cell 83$k$–1, and may enter the first polarizer 80$k$–1 as S-polarized light, and may be reflected at high reflectivity by the first polarizer 80$k$–1.

Randomly polarized ASE light with a wavelength of 10.59 μm generated in the power amplifier 12$k$ may travel toward a direction where the optical isolator 18$k$ is provided on the downstream side of the power amplifier 12$k$.

The ASE light having entered the optical isolator 18$k$ may pass through the wavelength filter 44$k$ at high transmittance after a phase difference of 90° is provided to the ASE light by the first retarder 43$k$. ASE light of an S-polarized component with respect to an incident surface of the first polarizer 80$k$ of the ASE light having passed through the wavelength filter 44$k$ at high transmittance may be reflected at high reflectivity by the first polarizer 80$k$, and ASE light of a P-polarized component of the ASE light having passed through the wavelength filter 44$k$ at high transmittance may pass through the first polarizer 80$k$ at high transmittance.

The ASE light having passed through the first polarizer 80$k$ is linearly polarized light in the Y direction, and may pass as it is through the EO Pockels cell 83$k$ to enter the third retarder 82$k$. In the third retarder 82$k$, the linearly polarized ASE Light in the Y direction may be converted into linearly polarized light in the X direction. The ASE light converted into linearly polarized light in the X direction in such a manner may enter the second polarizer 81$k$ as S-polarized light, and may be reflected by the second polarizer 81$k$ at high reflectivity.

It is to be noted that circularly polarized pulsed laser light having entered the optical isolator 18$k$–1 from a power amplifier adjacent to the power amplifier 12$k$ on the upstream side of the power amplifier 12$k$ may be converted into linearly polarized light in the Y direction by the first retarder 43$k$–1. The pulsed laser light converted into linearly polarized light in the Y direction by the first retarder 43$k$–1 may pass through the wavelength filter 44$k$–1 at high transmittance to enter the first polarizer 80$k$–1 as P-polarized light, and may pass through the first polarizer 80$k$–1 at high transmittance. This linearly polarized light in the Y direction may pass as it is through the EO Pockels cell 83$k$–1 to enter the third retarder 82$k$–1. The linearly polarized pulsed laser light in the Y direction having entered the third retarder 82$k$–1 may be converted into linearly polarized light in the X direction by the third retarder 82$k$–1. The pulsed laser light converted into the linearly polarized light in the X direction may enter the second polarizer 81$k$–1 as S-polarized light to be reflected at high reflectivity by the second polarizer 81$k$–1. Therefore, in this case, the pulsed laser light may be prevented by the optical isolator 18$k$–1 from entering the power amplifier 12$k$.

Next, for example, a case where both the EO Pockels cell 83$k$–1 and the EO Pockels cell 83$k$ are on will be described below with reference to FIG. 14($b$). Linearly polarized light in the X direction and linearly polarized light in the Y direction entering the EO Pockels cell $83k$-1 and the EO Pockels cell $83k$ may be converted into linearly polarized light in the Y direction and linearly polarized light in the X direction, respectively, by turning on the EO Pockels cell $83k$-1 and the EO Pockels cell $83k$.

Randomly polarized ASE light with a wavelength of 10.59 μm generated in the power amplifier $12k$ may travel toward a direction where the optical isolator $18k$-1 is provided on the upstream side of the power amplifier $12k$.

The ASE light having entered the optical isolator $18k$-1 may enter the second polarizer $81k$-1 after a phase difference of 90° is provided to the ASE light by the second retarder $42k$-1. In the second polarizer $81k$-1, ASE light of an S-polarized component with respect to the incident surface of the second polarizer $81k$-1 may be reflected at high reflectivity by the second polarizer $81k$-1, and ASE light of a P-polarized light may pass through the second polarizer $81k$-1 at high transmittance.

The ASE light having passed through the second polarizer $81k$-1 is linearly polarized light in the Y direction, and may enter the third retarder $82k$-1. In the third retarder $82k$-1, the linearly polarized ASE light in the Y direction may be converted into linearly polarized light in the X direction. The ASE light converted into linearly polarized light in the X direction in such a manner may be converted into linearly polarized light in the Y direction again by changing a phase difference thereof by 180° in the EO Pockels cell $83k$-1. As a result, this linearly polarized light in the Y direction may enter the first polarizer $80k$-1 as P-polarized light, and may pass through the first polarizer $80k$-1 at high transmittance. The linearly polarized ASE light in the Y direction having passed through the first polarizer $80k$-1 may pass through the wavelength filter $44k$-1 at high transmittance to enter the first retarder $43k$-1, and may be converted into circularly polarized light by changing the phase difference thereof by 90° in the first retarder $43k$-1. As a result, the ASE light may travel upstream along the optical path of the pulsed laser light.

Randomly polarized ASE light with a wavelength of 10.59 μm generated in the power amplifier $12k$ may travel toward a direction where the optical isolator $18k$ is provided on the downstream side of the power amplifier $12k$-1.

The ASE light having entered the optical isolator $18k$ may pass through the wavelength filter $44k$ at high transmittance after a phase difference of 90° is provided to the ASE light by the first retarder $43k$. ASE light of an S-polarized component with respect to the incident surface of the first polarizer $80k$ of the ASE light having passed through the wavelength filter $44k$ may be reflected at high reflectivity by the first polarizer $80k$, and ASE light of a P-polarized component of the ASE light having passed through the wavelength filter $44k$ may pass through the first polarizer $80k$ at high transmittance.

The ASE light having passed through the first polarizer $80k$ is linearly polarized light in the Y direction, and may be converted into linearly polarized light in the X direction by changing a phase difference thereof by 180° in the EO Pockels cell $83k$. This linearly polarized light in the X direction may enter the third retarder $82k$. In the third retarder $82k$, the linearly polarized ASE light in the X direction may be converted into linearly polarized light in the Y direction. The ASE light converted into linearly polarized light in the Y direction may enter the second polarizer $81k$ as P-polarized light, and may pass through the second polarizer $81k$ at high transmittance. This linearly polarized light in the Y direction may enter the second retarder $42k$, and may be converted into circularly polarized light by changing the phase difference thereof by 90° in the second retarder $42$. As a result, this circularly polarized light may travel downstream along the optical path of the pulsed laser light.

It is to be noted that circularly polarized pulsed laser light having entered the optical isolator $18k$-1 from a power amplifier adjacent to the power amplifier $12k$ on the upstream side of the power amplifier $12k$ may be converted into linearly polarized light in the Y direction by changing the phase difference thereof by 180° in the first retarder $43k$-1. The pulsed laser light converted into linearly polarized light in the Y direction by the first retarder $43k$-1 may pass through the wavelength filter $44k$-1 at high transmittance to enter the first polarizer $80k$-1 as P-polarized light, and may pass through the first polarizer $80k$-1 at high transmittance. This linearly polarized light in the Y direction may enter the EO Pockels cell $83k$-1. The linearly polarized pulsed laser light in the Y direction having entered the EO Pockels cell $83k$-1 may be converted into linearly polarized light in the X direction by changing the phase difference thereof by 180° in the EO Pockels cell $83k$-1. This linearly polarized light in the X direction may enter the third retarder $82k$-1. The linearly polarized pulsed laser light in the X direction having entered the third retarder $82k$-1 may be converted into linearly polarized light in the Y direction again by the third retarder $82k$-1. The pulsed laser light converted into linearly polarized light in the Y direction in such a manner may enter the second polarizer $81k$-1 as P-polarized light, and may pass through the second polarizer $81k$-1. Then, this linearly polarized light in the Y direction may enter the second retarder $42k$-1, and may be converted into circularly polarized light by changing the phase difference thereof by 180° in the second retarder $42k$-1. As a result, this circularly polarized light may travel downstream along the optical path of the pulsed laser light. Therefore, the pulsed laser light may pass through the optical isolator $18k$-1 at high transmittance to enter the power amplifier $12k$.

It is to be noted that the optical isolator $18k$ may operate in a manner similar to that of the optical isolator $18k$-1.

6.4.3 Control

For example, the laser apparatus of the present disclosure may perform control to allow a timing at which the EO Pockels cell $83k$-1 and the EO Pockels cell $83k$ are turned on to synchronize a timing at which pulsed laser light as seed light (with a pulse width of about 20 ns) passes therethrough. Time in which the EO Pockels cell $83k$-1 and $83k$ are kept on may be about 30 to 100 ns. More specifically, when a trigger signal is inputted from an external apparatus such as the EUV light generation system control section 330 to the laser control section 310, the trigger signal may be inputted to the control circuit 320 through the laser control section 310. Thus, when the trigger signal is inputted to the control circuit 320, a trigger may be inputted from the control circuit 320 to the MO 110 to output pulsed laser light from the MO 110.

At a timing at which this pulsed laser light passes through the EO Pockels cell $83k$ or the like in the optical isolator $18k$ or the like, a predetermined pulse signal may be inputted from the control circuit 320 to a power supply of the EO Pockels cell $83k$ or the like. Accordingly, a potential may be applied to the EO Pockels cell $83k$ or the like for about 30 to 100 nm, and pulsed laser light serving as seed light may pass through the EO Pockels cell $83k$ or the like. The pulsed laser light serving as seed light may be amplified by the power amplifier $12k$ and the like by sequentially performing such an operation in the EO Pockels cell 83k–1, 83k, and the like in the optical isolators 180, 181, 182, . . . , 18k, . . . , and 18n.

Figure 15:
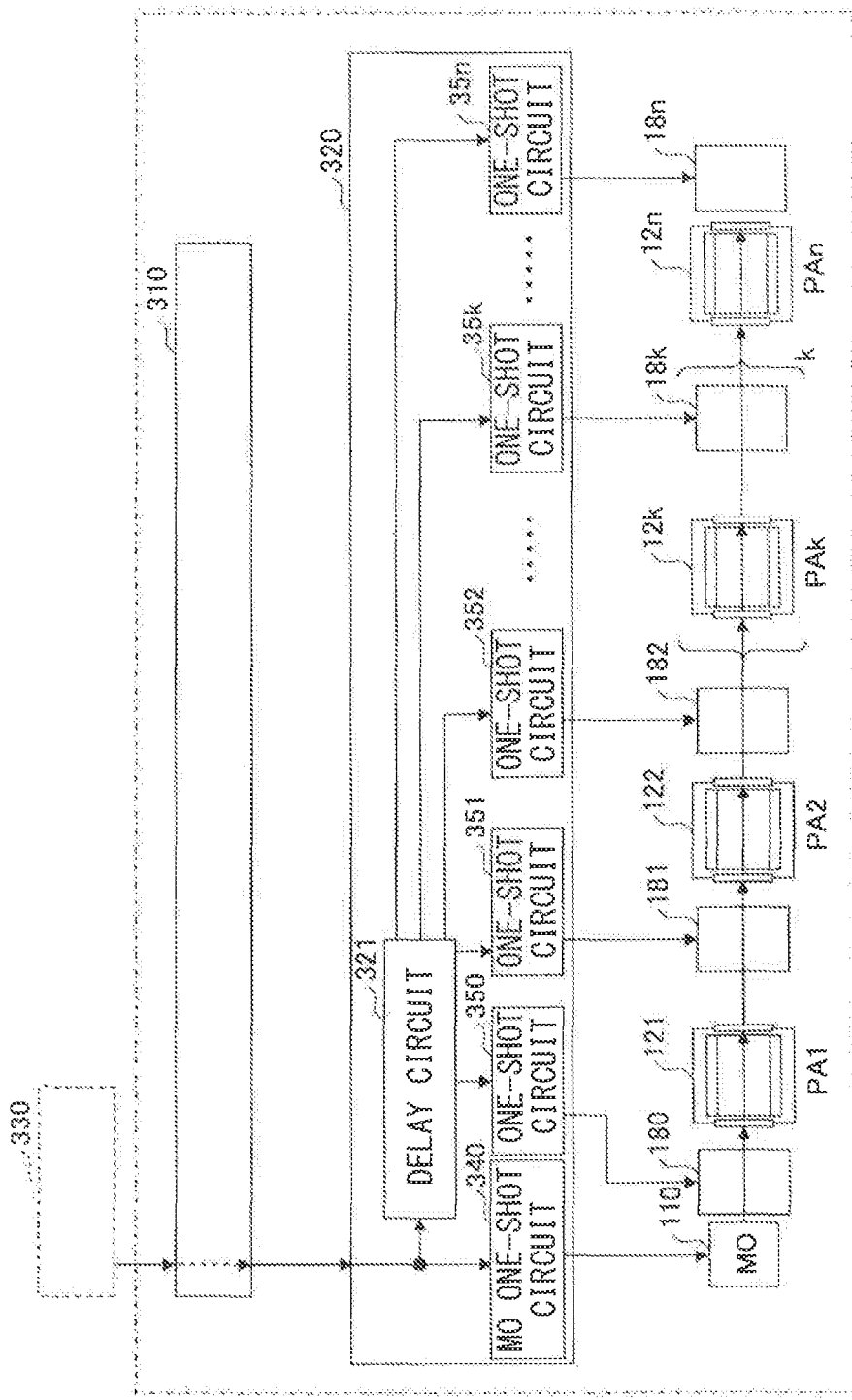
FIG. 15 is an explanatory diagram of a control circuit of a laser apparatus including an optical isolator of the present disclosure.

The above control will be described in more detail below with reference to FIGS. 15 and 16.

6.4.3.1 Configuration of Control Circuit

The control circuit 320 may include a delay circuit 321, an MO one-shot circuit 340, and one-shot circuits 350, 351, 352, . . . , 35k, . . . , and 35n. A connection may be made such that an output of the MO one-shot circuit 340 is inputted to the MO 110. A connection may be made such that outputs in the one-shot circuits 350, 351, 352, . . . , 35k, . . . , and 35n are inputted to the respective optical isolators 180, 181, 182, . . . , 18k, . . . , and 18n. A connection may be made such that an output of the delay circuit 321 is inputted to each of the one-shot circuits 350, 351, 352, . . . , 35k, . . . , and 35n.

The MO one-shot circuit 340 may be so set as to output pulsed laser light with a desired pulse width, for example, as to output pulsed laser light with a pulse width of 10 to 20 ns from the MO 110.

It is to be noted that the optical isolator with a configuration in which the third retarder 82k or the like is provided in the isolator 18k or the like, and the retarder 82k provides a phase difference of 180° to rotate a polarization direction by 90° is described. However, the third retarder 82k or the like may not be provided in the isolator 18k or the like, and incident surfaces of the first polarizer 43k and the second polarizer 42k or the like may be disposed orthogonal to each other.

6.4.3.2 Operation of Control Circuit

A trigger signal inputted from the external apparatus such as the EUV light generation system control section 330 to the laser control section 310 may be inputted to the delay circuit 321 and the MO one-shot circuit 340 in the control circuit 320.

Figure 16:
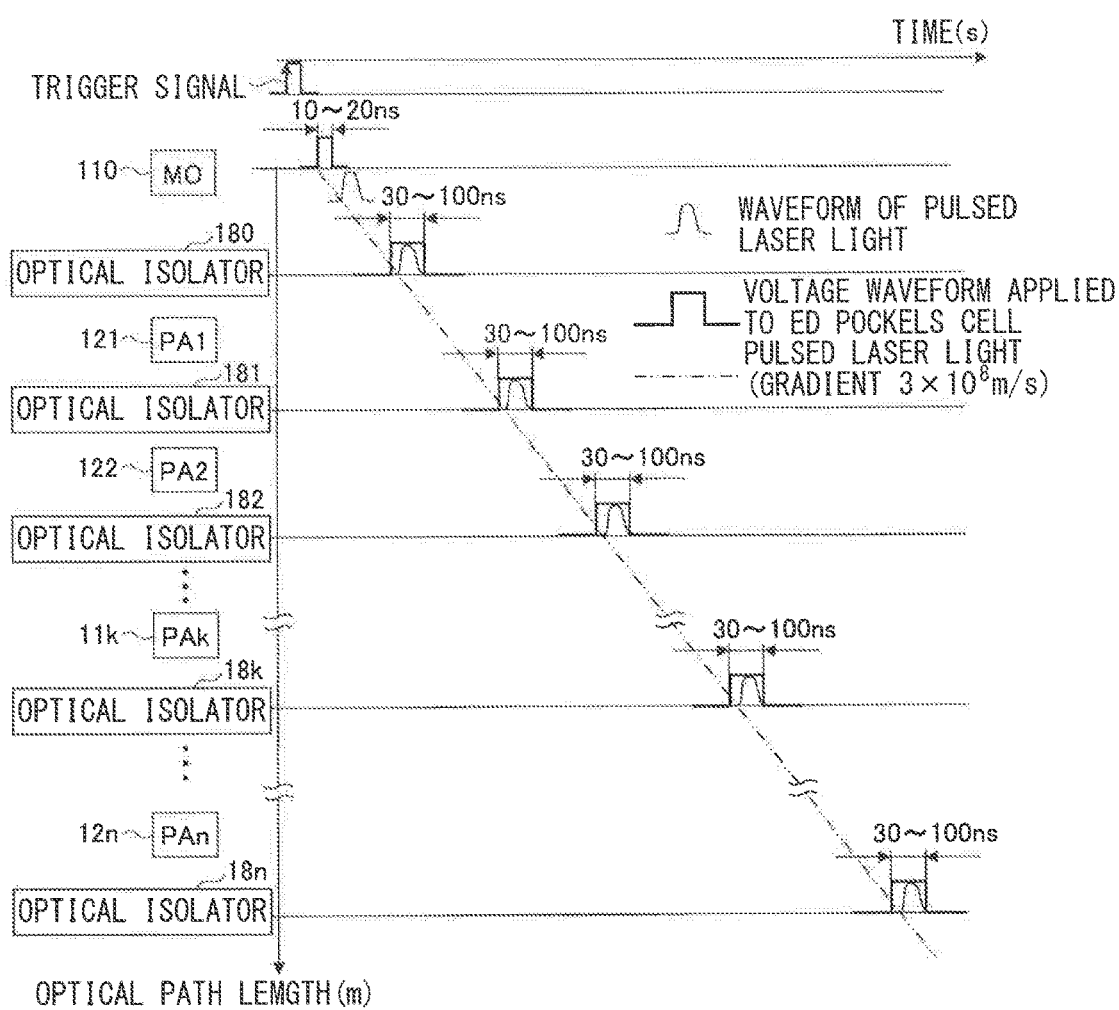
FIG. 16 is an explanatory diagram of control by the control circuit of the laser apparatus including the optical isolator of the present disclosure.

As illustrated in FIG. 16, when the trigger signal is inputted to the delay circuit 321 and the MO one-shot circuit 340, pulse signals may be sequentially outputted from the MO one-shot circuit 340 and the one-shot circuits 350, 351, 352, . . . , 35k, . . . , and 35n.

The MO 110 may output pulsed laser light with a pulse width of 10 to 20 ns by the input of the pulse signal from the MO one-shot circuit 340. The optical isolators 180, 181, 182, . . . , 18k, . . . , and 18n may be so set as to be kept on for 30 to 100 ns by the input of pulse signals from the one-shot circuits 350, 351, 352, . . . , 35k, . . . , and 35n.

As illustrated in FIG. 16, the delay circuit 321 may be so set as to output a pulse signal delayed with respect to the inputted trigger signal from the one-shot circuits 350, 351, 352, . . . , 35k, . . . , and 35n. Each of the one-shot circuits 350, 351, 352, . . . , 35k, . . . , and 35n may be so set as to output a pulse signal with a longer pulse width than the pulse width of the pulsed laser light, for example, a pulse signal with a pulse width of 30 to 100 ns.

Accordingly, immediately before the pulsed laser light passes through each of the optical isolators 180, 181, 182, . . . , 18k, . . . , and 18n, each of the optical isolators 180, 181, 182, . . . , 18k, . . . , and 18n may be turned to a state in which the pulsed laser light is allowed to pass therethrough, and after the pulsed laser light passes therethrough, each of the optical isolators 180, 181, 182, . . . , 18k, . . . , and 18n may be turned to a state in which transmission of light is suppressed.

Thus, the optical isolator 18k and the like allow light to pass therethrough only in a case where pulsed laser light passes therethrough. Therefore, self-oscillation in the 10.57-μm wavelength band may be suppressed, and pulsed laser light serving as seed light may be amplified. Moreover, reflected light of the pulsed laser light applied to the target in the plasma generation region 25 in the chamber 2 may be suppressed.

6.4.4 Action

In the laser apparatus of the present disclosure, when pulsed laser light serving as seed light passes through the EO Pockels cell 83k or the like, the EO Pockels cell 83k or the like is turned on. Therefore, self-oscillation of ASE light including the 10.59-μm wavelength band may be suppressed, and the pulsed laser light may be amplified.

7. Polarizer

Figure 17:
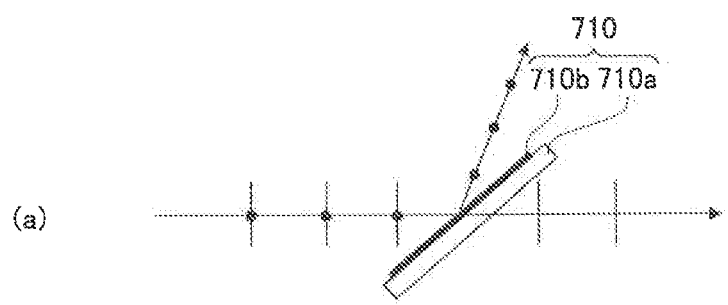
FIG. 17 is an explanatory diagram of a polarizer.
Figure 17:
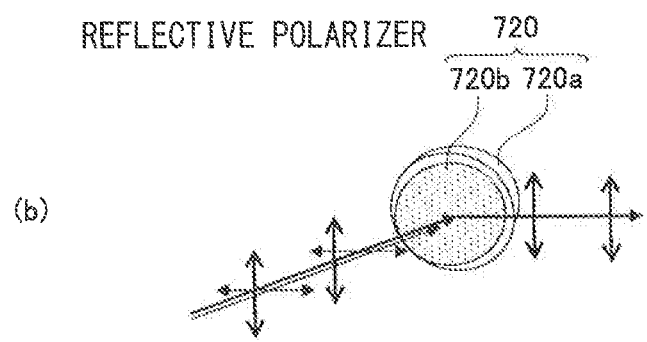

Each of the polarizer 41k and the like, the first polarizer 80k and the like, the second polarizer 81k and the like in the optical isolators of the laser apparatus of the present disclosure may each be a transmissive polarizer 710 or a reflective polarizer 720. FIG. 17(a) illustrates the transmissive polarizer 710, and FIG. 17(b) illustrates the reflective polarizer 720.

The transmissive polarizer 710 illustrated in FIG. 17(a) may be a polarizer in which a multilayer film 710b with predetermined spectral characteristics is formed on a surface of a substrate 710a that allows light with a predetermined wavelength to pass therethrough. The polarizer may reflect S-polarized light at high reflectivity and allow P-polarized light to pass therethrough at high transmittance. A material forming the substrate 710a may be a material including ZnSe, GaAs, diamond, or the like that allows $CO_2$ laser light to pass therethrough.

The reflective polarizer 720 illustrated in FIG. 17(b) may be a polarizer in which a multilayer film 720b with predetermined spectral characteristics is formed on a surface of a substrate 720a, and that reflects S-polarized light at high reflectivity and absorbs P-polarized light at high absorptance. The reflective polarizer 720 is allowed to be cooled from a back surface of the substrate 720a. Therefore, change in wavefront aberration of reflected laser light may be suppressed.

8. Wavelength Filter

The wavelength filter 44k and the like in the optical isolators of the laser apparatus of the present disclosure may be of the following configuration.

8.1 Wavelength Filter in which Multilayer Film is Formed

Figure 18:
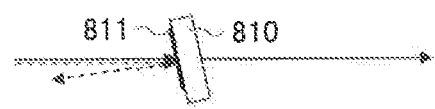
FIG. 18 is a configuration diagram of a wavelength filter in which a multilayer film is formed.
Figure 19:
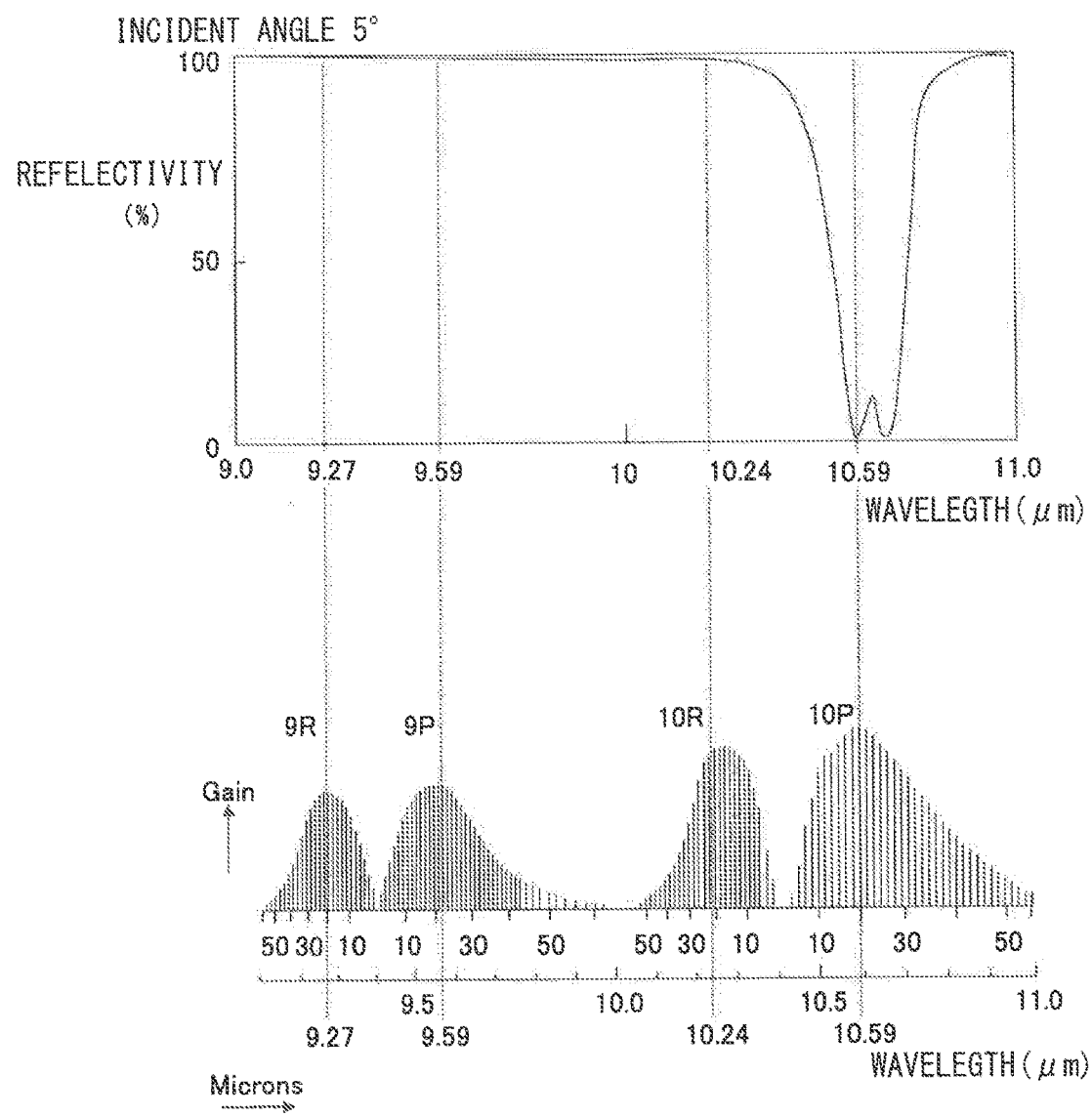
FIG. 19 is a characteristic diagram of reflectivity of the wavelength filter in which the multilayer film is formed.

As illustrated in FIG. 18, each of the wavelength filter 44k and the like may be an optical device in which a wavelength-selective transmission film 811 is formed on a surface of the substrate 810 that allows $CO_2$ laser light to pass therethrough. The substrate 810 may be formed of ZnSe, GaAs, diamond, or the like. The wavelength filter 44k and the like may be disposed at a predetermined incident angle that is larger than 0° with respect to an optical path axis of pulsed laser light in the laser apparatus. The wavelength-selective transmission film 811 may be formed of a multilayer film in which a high refractive index material and a low refractive index material are alternately laminated. As the high refractive index material, ZnSe, ZnS, or the like may be used, and as the low refractive index material, $ThF_4$, $PbF_2$, or the like may be used. In a case where the wavelength-selective transmission film 811 is disposed at a predetermined incident angle, the wavelength-selective transmission film 811 may be so formed as to allow pulsed laser light in the 10.59-μm wavelength band outputted from the MO 110 to pass therethrough at high transmittance and as to reflect light in the 9.27-μm wavelength band, the 9.59-μm wavelength band, and 10.24-μm wavelength band at high reflectivity. FIG. 19 illustrates reflectivity characteristics in a case where the wavelength filter illustrated in FIG. 5 is so disposed as to allow the incident angle of light entering the wavelength filter to be 5°.

8.2 Wavelength Filter Using a Plurality of Polarizers

Figure 20:
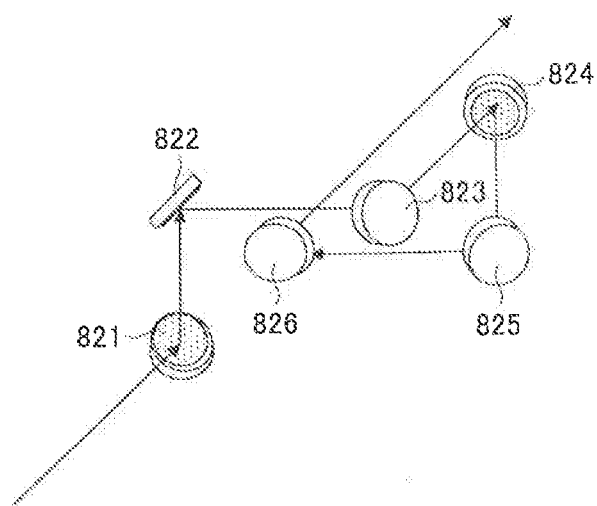
FIG. 20 is a configuration diagram of a wavelength filter using a plurality of polarizers.

As illustrated in FIG. 20, each of the wavelength filter 44k and the like may be a wavelength filter using a plurality of reflective polarizers. More specifically, each of the wavelength filter 44k and the like may be an optical system using a first reflective polarizer 821, a second reflective polarizer 822, a third reflective polarizer 823, a fourth reflective polarizer 824, a fifth reflective polarizer 825, and a sixth reflective polarizer 826. The first reflective polarizer 821 and the second reflective polarizer 822 may be polarizers that absorb entered P-polarized light in the 9.27-μm wavelength band at high absorptance and reflect entered S-polarized light in the 9.27-μm wavelength band at high reflectivity. The third reflective polarizer 823 and the fourth reflective polarizer 824 may be polarizers that absorb entered P-polarized light in the 9.59-μm wavelength band at high absorptance and reflect entered S-polarized light in the 9.59-μm wavelength band at high reflectivity. The fifth reflective polarizer 825 and the sixth reflective polarizer 826 may be polarizers that absorb entered P-polarized light in the 10.24-μm wavelength band at high absorptance and reflect entered S-polarized light in the 10.24-μm wavelength band at high reflectivity.

The second reflective polarizer 822 may be so disposed as to allow light in the 9.27-μm wavelength band reflected by the first reflective polarizer 821 to enter as P-polarized light. In other words, the first reflective polarizer 821 and the second reflective polarizer 822 may be disposed in so-called crossed nicols. The fourth reflective polarizer 824 may be so disposed as to allow light in the 9.59-μm wavelength band reflected by the third reflective polarizer 823 to enter as P-polarized light. In other words, the third reflective polarizer 823 and the fourth reflective polarizer 824 may be disposed in so-called crossed nicols. The sixth reflective polarizer 826 may be so disposed as to allow light in the 10.24-μm wavelength band reflected by the fifth reflective polarizer 825 to enter as P-polarized light. In other words, the fifth reflective polarizer 825 and the sixth reflective polarizer 826 may be disposed in so-called crossed nicols.

The first reflective polarizer 821, the second reflective polarizer 822, the third reflective polarizer 823, the fourth reflective polarizer 824, the fifth reflective polarizer 825, and the sixth reflective polarizer 826 generate heat by absorbing P-polarized light. Therefore, they may be cooled by an unillustrated cooling system. This cooling system may be, for example, a cooling pipe or the like that allows cooling water to flow therethrough.

Figure 21:
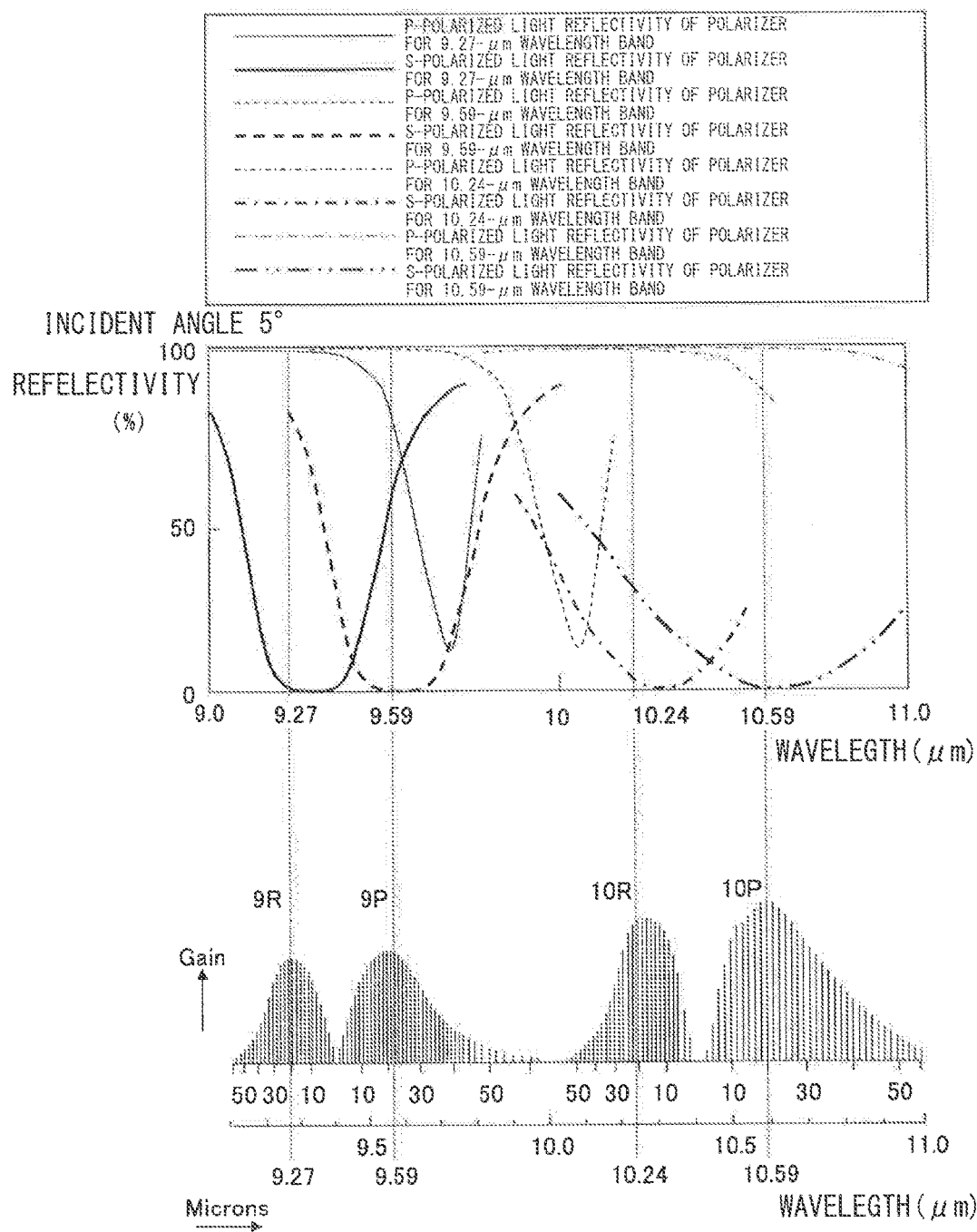
FIG. 21 is a characteristic diagram of reflectivity of the wavelength filter using the plurality of polarizers.

Therefore, light in the 9.27-μm wavelength band may be absorbed by the first reflective polarizer 821 and the second reflective polarizer 822. Light in the 9.59-μm wavelength band may be absorbed by the third reflective polarizer 823 and the fourth reflective polarizer 824. Light in the 10.24-μm wavelength band may be absorbed by the fifth reflective polarizer 825 and the sixth reflective polarizer 826. Thus, the light in the 9.27-μm wavelength band, the light in the 9.59-μm wavelength band, and the light in the 10.24-μm wavelength band may be absorbed by the wavelength filter illustrated in FIG. 20, and pulsed laser light in the 10.59-μm wavelength band may be outputted. FIG. 21 illustrates reflectivity characteristics of P-polarized light and S-polarized light in a case where light enters, at an incident angle of 45°, polarizers for the 9.27-μm wavelength band, the 9.59-μm wavelength band, the 10.24-μm wavelength band, and the 10.59-μm wavelength band.

8.3 Wavelength Filter Using Etalon

Figure 22:
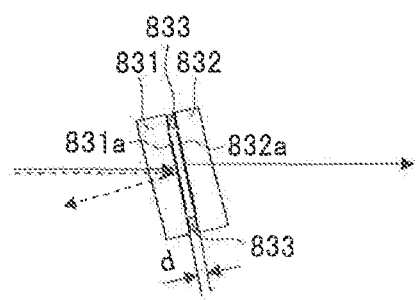
FIG. 22 is a configuration diagram of a wavelength filter using an etalon.

Each of the wavelength filter 44k and the like may be a wavelength filter using an etalon as illustrated in FIG. 22. More specifically, the etalon may be an etalon in which partially reflective films 831a and 832a are formed on respective surfaces on one side of two substrates 831 and 832 formed of ZnSe or the like, and the surfaces where the respective partially reflective films 231a and 232a are formed of the substrates 231 and 232 are opposed to each other and are bonded together with a spacer 833 in between. Reflectivity of the thus-formed partially reflective films 831a and 832a may be 70 to 90%.

The etalon used in the wavelength filter may be preferably an air-gap etalon with an FSR (free spectral range) of 1.5 μm or more. For example, such an etalon may be so formed as to allow an interval d between the substrate 831 and the substrate 832 to be about 37.4 μm, based on the following expression (1), assuming that a wavelength λ of pulsed laser light is 10.59 μm, and a refractive index n of nitrogen gas is 1.000.

$$FSR = \lambda^2/(2nd) = 1.5 \text{ μm} \quad (1)$$

Figure 23:
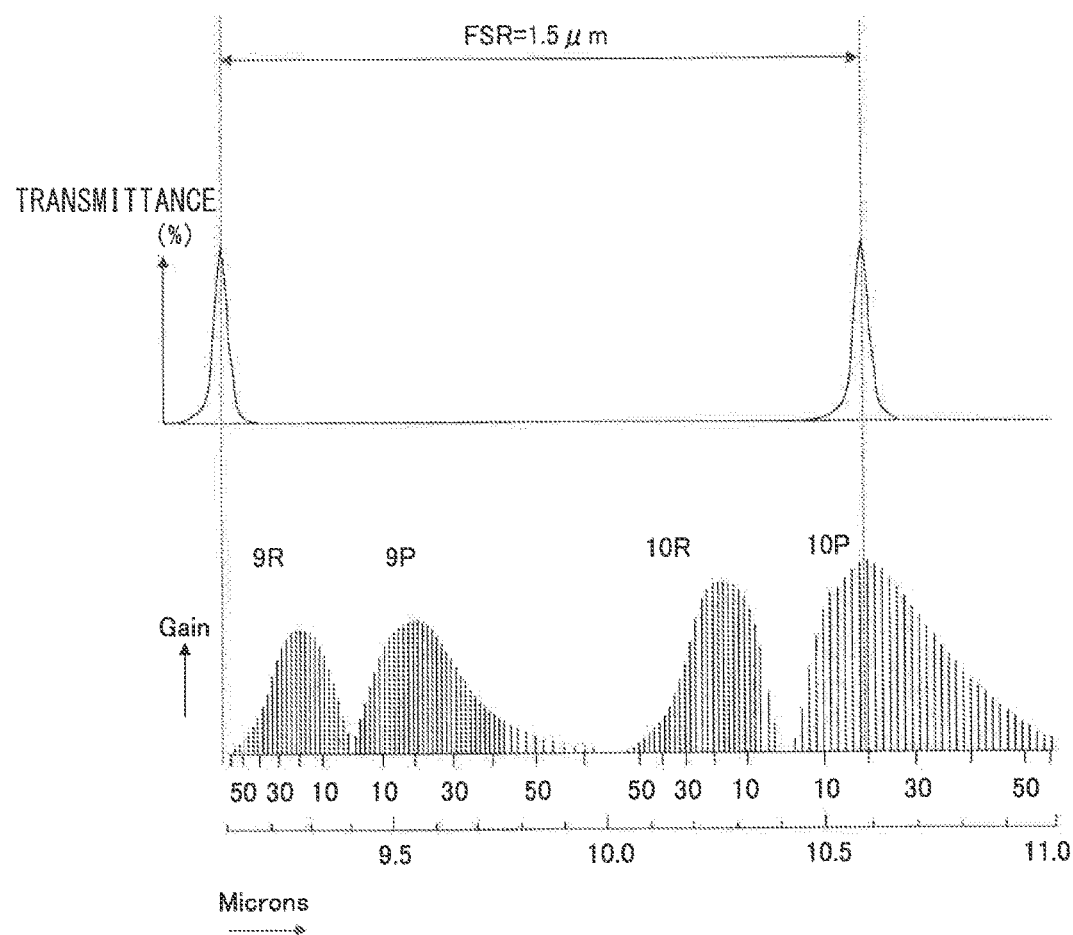
FIG. 23 is a characteristic diagram of reflectivity of the wavelength filter using the etalon.

In this wavelength filter, a selective wavelength is allowed to be changed by changing an incident angle of light entering the etalon. Therefore, the selective wavelength of the wavelength filter is allowed to be adjusted by changing the incident angle of the entering light. FIG. 23 illustrates transmittance characteristics of the wavelength filter illustrated in FIG. 22.

8.4 Wavelength Filter Including Grating and Slit

Figure 24:
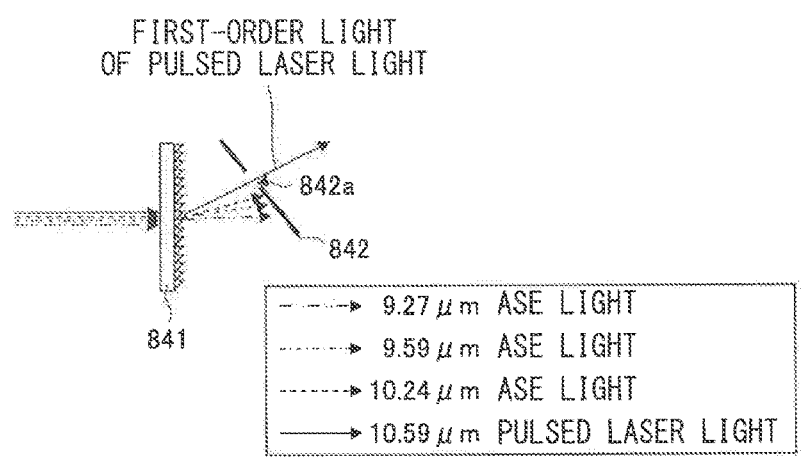
FIG. 24 is a configuration diagram of a wavelength filter including a grating and a slit.
Figure 25:
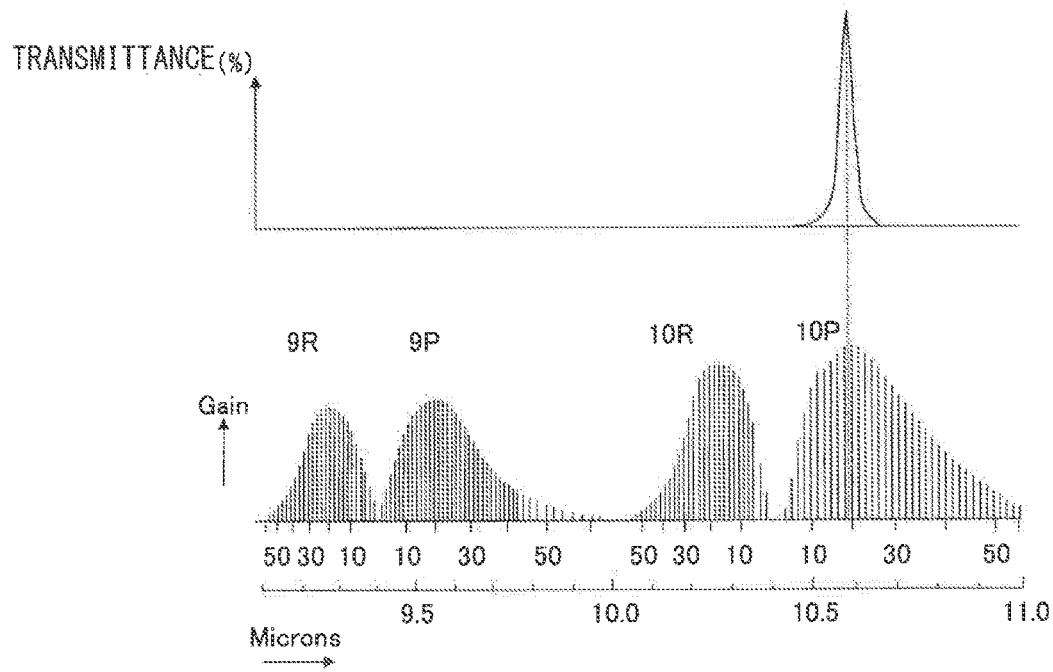
FIG. 25 is a characteristic diagram of reflectivity of the wavelength filter including the grating and the slit.

As illustrated in FIG. 24, each of the wavelength filter 44k and the like may include a grating 841 and a slit plate 842 in which a slit 842a is formed. The grating 841 may be a transmissive grating. The slit plate 842 may be so disposed as to allow first-order diffracted light in the 10.59-μm wavelength band having passed through the grating 841 to pass through the slit 842a and as to shield ASE light in the 9.27-μm wavelength band, 9.59-μm wavelength band, and the 10.24-μm wavelength band. FIG. 25 illustrates transmittance characteristics of the wavelength filter illustrated in FIG. 24.

9. Retarder

Figure 26:
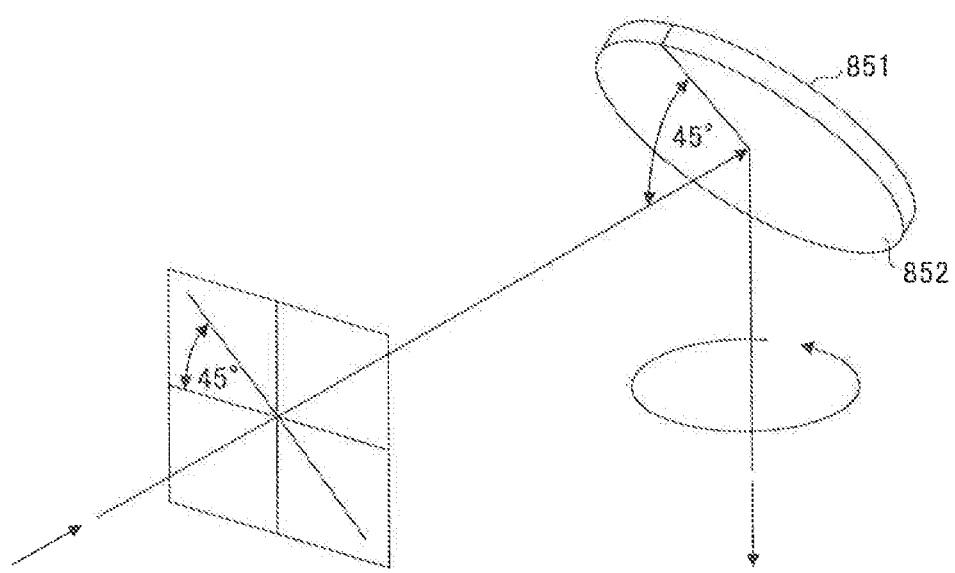
FIG. 26 is an explanatory diagram of a reflective retarder.

Each of the first retarder 43k and the like and the second retarder 42k and the like in the laser apparatus of the present disclosure may be a transmissive retarder such as a λ/4 wavelength plate, or a reflective retarder illustrated in FIG. 26. The reflective retarder illustrated in FIG. 26 may be a retarder by which linearly polarized light is reflected as being converted into circularly polarized light when the linearly polarized light enters a surface 852 of a substrate 851 at an angle of 45°.

Moreover, each of the third retarder 82k and the like may be a transmissive retarder such as a λ/2 wavelength plate, or a reflective retarder similar to that illustrated in FIG. 26. When linearly polarized light enters the surface 852 of the substrate 851 at an angle of 45°, the reflective retarder in this case may rotate the direction of the linearly polarized light by 90°, and may reflect the linearly polarized light. It should therefore be appreciated that variations may be made in embodiments of the disclosure by persons skilled in the art without departing from the scope as defined by the appended claims.

The terms used throughout the specification and the appended claims are to be construed as "open-ended" terms. For example, the term "includes/include/including" or "included" is to be construed as "including but not limited to". The term "has/have/having" is to be construed as "having but not limited to". Also, the indefinite article "a/an" described in the specification and recited in the appended claims is to be construed to mean "at least one" or "one or more".

This application claims the priority benefit of Japanese Patent Application No. 2013-017272 filed on Jan. 31, 2013, and the entire content of Japanese Patent Application No. 2013-017272 is hereby incorporated by reference.

REFERENCE SIGNS LIST

1 EUV light generation system
2 Chamber
3 Laser apparatus
4 Target sensor
5 EUV light generation control section
6 Exposure apparatus
13 Aperture plate
13a Opening section
21 Window
22 Laser light collecting mirror
22a Laser light condensing optical system
23 EUV collector mirror
24 Through hole
25 Plasma generation region
26 Target generation section
27 Target
28 Target collection section
29 Connection section
31 Pulsed laser light
32 Pulsed laser light
33 Pulsed laser light
34 Laser light traveling direction control section
110 MO
121 to 12n Power amplifier
140 to 14n Optical isolator
150 to 15n Optical isolator
160 to 16n Optical isolator
170 to 17n Optical isolator
180 to 18n Optical isolator
251 Radiation light
252 Reflected light
291 Wall
292 Intermediate condensing point (IF)
310 Laser control section
320 Control circuit
330 EUV light generation system control section
340 MO one-shot circuit
350 to 35n One-shot circuit
410 to 41n Polarizer
420 to 42n Second retarder
430 to 43n First retarder
44k-1, 44k Wavelength filter
45k-1, 45k Spatial filter
450a Spatial filter
46k-1, 46k Saturable absorption gas cell
80k-1, 80k First polarizer
81k-1, 81k Second polarizer
82k-1, 82k Second retarder
83k-1, 83k EO Pockels cell

The invention claimed is:

1. A laser apparatus comprising:
a master oscillator configured to output pulsed laser light;
two or more power amplifiers disposed in an optical path of the pulsed laser light to amplify the pulsed laser light; and
a plurality of optical isolators, each provided between adjacent two of the power amplifiers in the optical path of the pulsed laser light, and each configured to suppress transmission of light traveling from the power amplifiers to a side where the master oscillator is provided,
at least one of the optical isolators including a first retarder, wavelength filter configured to allow light with a wavelength of the pulsed laser light to pass therethrough, and suppress transmission of light with a wavelength other than the wavelength of the pulsed laser light, a first polarizer configured to provide a phase difference of ¼ wavelength, an EO Pockels cell, a second retarder, a third retarder configured to provide a phase difference of ½ wavelength, and a second polarizer, and
the wavelength filter including a substrate and a multilayer film, the substrate containing ZnSe, and the multilayer film being provided on a surface of the substrate and containing ZnSe and $ThF_4$.

2. The laser apparatus according to claim 1, wherein the power amplifier includes a gas medium containing $CO_2$ laser gas.

3. The laser apparatus according to claim 1, wherein the EO Pockels cell changes a phase difference of the pulsed laser light in synchronization with a timing at which the pulsed laser light passes through the EO Pockels cell.

4. An extreme ultraviolet light generation system comprising:
the laser apparatus according to claim 1;
a chamber;
a target generation section configured to feed a target into the chamber; and
a condensing optical system configured to condense the pulsed laser light outputted from the laser apparatus and apply the condensed pulsed laser light to the target in the chamber.

5. A laser apparatus comprising:
a master oscillator configured to output pulsed laser light;
two or more power amplifiers disposed in an optical path of the pulsed laser light to amplify the pulsed laser light; and
a plurality of optical isolators, each provided between adjacent two of the power amplifiers in the optical path of the pulsed laser light, and each configured to suppress transmission of light traveling from the power amplifiers to a side where the master oscillator is provided,
a first optical isolator of the plurality of optical isolators including a first retarder, a first polarizer configured to provide a phase difference of ¼ wavelength, an EO Pockels cell, a second retarder, a third retarder configured to provide a phase difference of ½ wavelength, and a second polarizer.

6. The laser apparatus according to claim 5, wherein the power amplifier includes a gas medium containing $CO_2$ laser gas.

7. The laser apparatus according to claim 5, wherein the first optical isolator further includes a wavelength filter configured to allow light with a wavelength of the pulsed laser light to pass therethrough, and suppress transmission of light with a wavelength other than the wavelength of the pulsed laser light.

8. The laser apparatus according to claim 5, wherein a second optical isolator of the plurality of optical isolators includes a spatial filter configured to allow the pulsed laser light to pass therethrough, and suppress transmission of ASE light generated in the power amplifiers.

9. The laser apparatus according to claim 5, wherein a second optical isolator of the plurality of optical isolators includes a saturable absorption gas cell configured to allow the pulsed laser light with energy equal to or higher than a predetermined energy level to pass therethrough, and suppress transmission of light generated in the power amplifiers and with energy equal to or lower than the predetermined energy level.

10. The laser apparatus according to claim 5, wherein the EO Pockels cell changes a phase difference of the pulsed laser light in synchronization with a timing at which the pulsed laser light passes through the EO Pockels cell.

11. An extreme ultraviolet light generation system comprising:
- the laser apparatus according to claim 5;
- a chamber;
- a target generation section configured to feed a target into the chamber; and
- a condensing optical system configured to condense the pulsed laser light outputted from the laser apparatus and apply the condensed pulsed laser light to the target in the chamber.

* * * * *